(12) United States Patent
Linnell et al.

(10) Patent No.: US 9,737,987 B1
(45) Date of Patent: Aug. 22, 2017

(54) VISUAL CARDS FOR DESCRIBING AND LOADING OPERATIONAL MODES TO MOTORIZED INTERFACE ELEMENT

(71) Applicant: X Development LLC, Mountain View, CA (US)

(72) Inventors: Jeff Linnell, Woodside, CA (US); Anthony Sean Jules, Oakland, CA (US); Matthew Bitterman, San Francisco, CA (US); Eli Reekmans, San Francisco, CA (US); Kendra Byrne, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 65 days.

(21) Appl. No.: 14/948,112

(22) Filed: Nov. 20, 2015

(51) Int. Cl.
*G06K 7/14* (2006.01)
*B25J 9/16* (2006.01)

(52) U.S. Cl.
CPC ............ *B25J 9/161* (2013.01); *B25J 9/1633* (2013.01); *G06K 7/1404* (2013.01); *Y10S 901/03* (2013.01)

(58) Field of Classification Search
CPC ...... B25J 9/1656; B25J 9/161; B25J 9/91633; G05B 19/0426; G06K 7/1404; G06K 7/10861; G06K 1/121; G06K 9/00476; G06K 9/00469
USPC ................. 700/245–264; 901/2–13
See application file for complete search history.

(56) References Cited

U.S. PATENT DOCUMENTS

| | | | |
|---|---|---|---|
| 3,372,568 A * | 3/1968 | Lemelson | B25J 5/02 409/80 |
| 4,613,942 A * | 9/1986 | Chen | G06T 1/0014 700/259 |
| 5,004,391 A | 4/1991 | Burdea | |
| 5,587,937 A | 12/1996 | Massie et al. | |
| 6,833,846 B2 | 12/2004 | Hasser | |
| 7,474,781 B2 | 1/2009 | Chamberlain | |
| 7,774,100 B2 * | 8/2010 | Aoyama | G06K 7/14 700/253 |
| 7,990,374 B2 | 8/2011 | Itkowitz | |
| 8,531,392 B2 | 9/2013 | Branton et al. | |
| 8,706,300 B2 | 4/2014 | Krause | |

(Continued)

FOREIGN PATENT DOCUMENTS

JP 2005068935 A 3/2005

OTHER PUBLICATIONS

Kickstarter, "SPIN remote—The Simplest, most Stylish remote ever", Dec. 2, 2014, <https://www.kickstarter.com/projects/spinremotelspin-remote-the-simplest-most-personal-remote-ever>.

(Continued)

*Primary Examiner* — Timothy Waggoner
(74) *Attorney, Agent, or Firm* — McDonnell Boehnen Hulbert & Berghoff LLP

(57) ABSTRACT

Disclosed are systems and methods for detecting a graphic card that visually describes an operational mode of a rotatable interface component via a plurality of curves for rotationally-varying parameters, determining the operational mode that is visually described on the graphic card, and loading the operational mode to the rotatable interface component, where the operational mode specifies operations for a motor such that the motor generates torque on the interface component based on the curves for the rotationally-varying parameters that are shown on the graphic card.

30 Claims, 15 Drawing Sheets

(56) References Cited

U.S. PATENT DOCUMENTS

| | | |
|---|---|---|
| 9,069,396 B2 | 6/2015 | Adler et al. |
| 2002/0036622 A1 | 3/2002 | Jaeger |
| 2003/0158628 A1* | 8/2003 | Matsuoka .............. G06K 17/00 700/245 |
| 2004/0193322 A1* | 9/2004 | Pirjanian ................ B25J 9/1656 700/259 |
| 2004/0257339 A1 | 12/2004 | Takahashi |
| 2007/0236450 A1 | 10/2007 | Colgate et al. |
| 2009/0009491 A1 | 1/2009 | Grivna |
| 2016/0089212 A1 | 3/2016 | Balicki et al. |

OTHER PUBLICATIONS

Badescu, Mircea; Wampler, Charles; Mavroidis, Constantino; "Rotary Haptic Knob for Vehicular Instrument Controls"; Proceedings of the 10th Symp. On Haptic Interfaces for Virtual Envir. & Teleoperator Systs. (HAPTICS'02); 2002; IEEE.

* cited by examiner

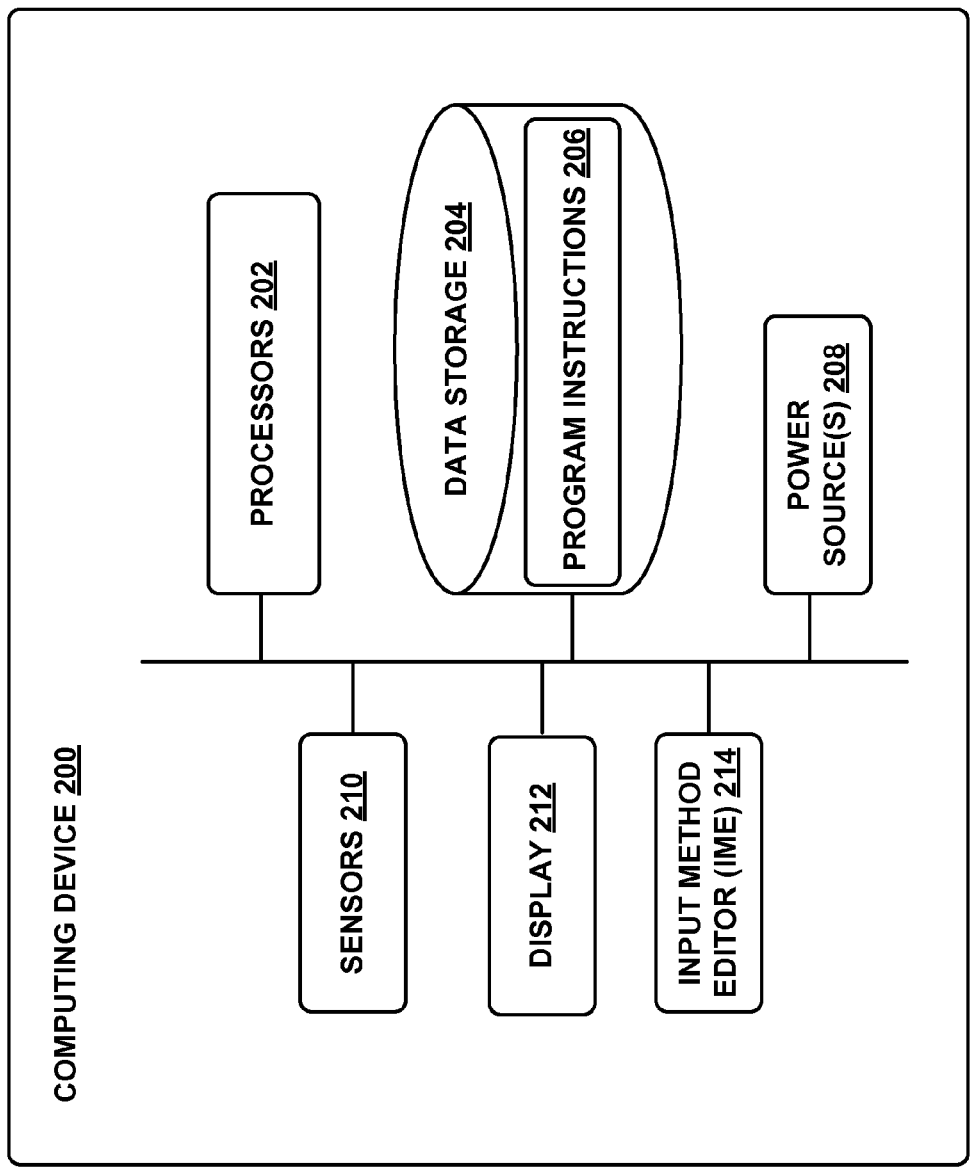

VISUAL CARDS FOR DESCRIBING AND LOADING OPERATIONAL MODES TO MOTORIZED INTERFACE ELEMENT

BACKGROUND

Unless otherwise indicated herein, the materials described in this section are not prior art to the claims in this application and are not admitted to be prior art by inclusion in this section.

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in actuators, sensing techniques, controllers, as well as component design and assembly.

SUMMARY

Example embodiments may relate to a haptic knob controller; and, in particular, to visual or graphic "cards" that visually describe rotationally-varying haptic parameters for the knob controller. Such visual cards may be user-generated or pre-defined, and may describe each rotationally-varying haptic parameter by way of a different curve on a common graph. Further, a control system (e.g., on the knob controller or a separate tablet) may be configured to detect and load such a visual card to the knob controller. In particular, the control system may load a visual card by setting an operational mode of the knob controller to correspond to the particular curves for the rotationally-varying haptic parameters that are shown on the card.

More generally, an example system may include: (a) at least one sensor that is operable to generate sensor data that is indicative of a graphic card that visually describes an operational mode of a rotatable interface component, wherein the graphic card visually describes the operational mode on a graph feature having a plurality of curves comprising at least a first and second curve, wherein the first curve indicates a first rotationally-varying parameter as a function of position of the rotatable interface component and the second curve indicates a second rotationally-varying parameter as a function of the position of the rotatable interface component; and (b) a computing system configured to: (i) analyze the sensor data to detect the graphic card; (ii) determine the operational mode corresponding to the graphic card; and (iii) load the operational mode to the rotatable interface component, wherein the operational mode specifies operations for a motor such that the motor applies torque to the rotatable interface component based at least in part on both the first curve of the first rotationally-varying parameter and the second curve of the second rotationally-varying parameter.

In another aspect, an example method may involve a computing device: (i) receiving sensor data from at least one sensor, (ii) analyzing the sensor data to detect a graphic card that visually describes an operational mode of a rotatable interface component, wherein the graphic card visually describes the operational mode on a graph feature having a plurality of curves comprising at least a first and second curve, wherein the first curve indicates a first rotationally-varying parameter as a function of position of the rotatable interface component and the second curve indicates a second rotationally-varying parameter as a function of the position of the rotatable interface component, (iii) determining, based on the graphic card, the operational mode corresponding to the graphic card, and (iv) loading the operational mode to the rotatable interface component, wherein the operational mode specifies operations for a motor such that the motor generates torque on the interface component based on both: (a) the first curve of the first rotationally-varying parameter and (b) the second curve of the second rotationally-varying parameter.

In a further aspect, another example system may include at least one wireless communication system that is operable to receive a radio-frequency (RF) signal comprising an indication of a graphic card that visually describes an operational mode of a rotatable interface component, wherein the graphic card visually describes the operational mode on a graph feature having a plurality of curves comprising at least a first and second curve, wherein the first curve indicates a first rotationally-varying parameter as a function of position of the rotatable interface component and the second curve indicates a second rotationally-varying parameter as a function of the position of the rotatable interface component. The system may also include a computing device configured to: (i) operate the wireless communication system to receive the RF signal; (ii) respond to receipt of the RF signal by determining the operational mode that is visually described by the graphic card; and (iii) load the operational mode to the rotatable interface component, wherein the operational mode specifies operations for a motor such that the motor applies torque to the rotatable interface component based at least in part on both: (a) the first curve of the first rotationally-varying parameter and (b) the second curve of the second rotationally-varying parameter.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 2A and 2B illustrate an example computing device, according to an example implementation.

DETAILED DESCRIPTION

Figure 1A:
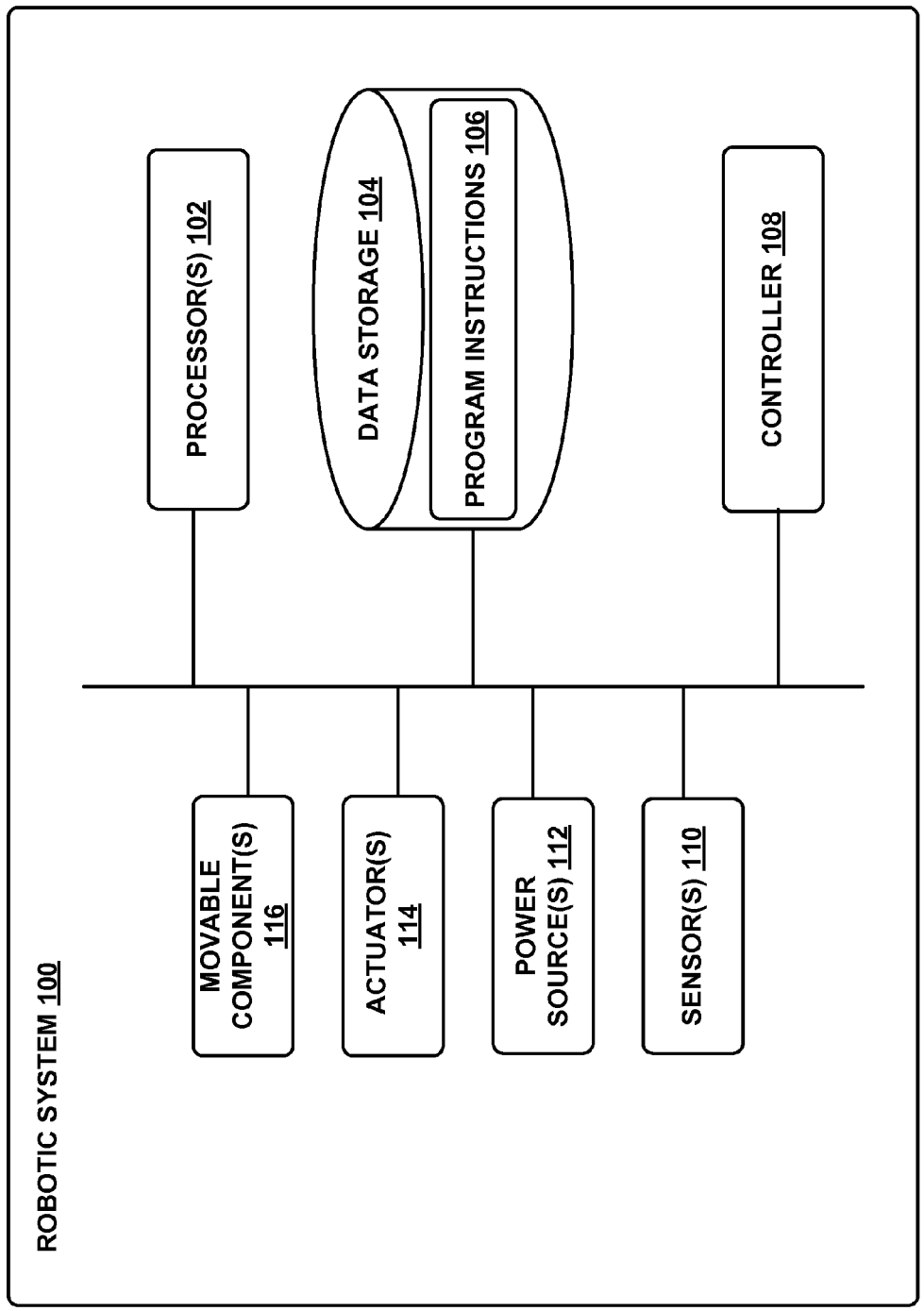
FIGS. 1A and 1B illustrate an example robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A visual interface may be provided for programming a handheld controller having a knob configured to provide haptic feedback (e.g., via a motor that varies the torque applied to the knob). An example handheld controller may include a knob and tactile (e.g., touch or near-touch) sensors coupled to the knob. The controller may link directly to a robot, or may output data from its sensors to a separate device (e.g., a tablet or laptop), which interprets the data and generates control signals for a robotic device based thereon. (Of course, the controller may link to and/or generate control signals for other types of devices as well.)

Further, an example interface may allow the user to create graphic cards (also referred to as "paint chips") and/or load such paint chips to the haptic controller. Each paint chip may provide a visualization of a particular set of parameters for a knob controller. In an example embodiment, a paint chip may include a graph with plots for several parameters of the knob controller.

More generally, an exemplary system may be configured to detect a paint chip specifying one or more rotationally-varying haptic parameters for the knob, and to responsively set the operational mode of the controller according to the paint chip. For example, an exemplary system may include at least one sensor that is operable to generate sensor data that is usable to identify a particular graphic "haptic-feel" card or paint chip, which comprises a graph feature. For instance, a camera may be used to detect a QR code identifying the paint chip, or an RFID reader may be used detect an RFID identifying the paint chip.

For example, a paint chip may include a graph feature showing a number of curves in different colors, which each correspond to a different "rotationally-varying parameter." Each rotationally-varying parameter may affect the haptic functions of the knob controller. Further, the graph can provide a linear visualization of how each rotationally-varying parameter varies as function of the position of the knob (e.g., as a function of degrees the knob has rotated from a base orientation), such that those working with such knob controllers may be able to quickly understand the "feel" of the knob controller that will result when the operational mode described by the paint chip is loaded to the knob controller.

II. Examples Systems for Control of Robotic Devices

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a robotic arm, a humanoid robot, or a quadruped robot, among others. In other examples, robotic system 100 may define a vehicle, a watch, a washing machine, actuated blinds, a conveyer belt, a speaker, or a light bulb, among many other examples. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 100). In other cases, an actuator may be a linear actuator that may be used in systems involving straight line motion. In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

The above description of processor(s) 102, data storage 104, program instructions 106, sensor(s) 110, and power source(s) 112 may apply to any discussion below relating to the respective component being used in another system or arrangements. For instance, FIGS. 2A and 3A (among other possible figures) illustrate processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure.

Figure 1B:
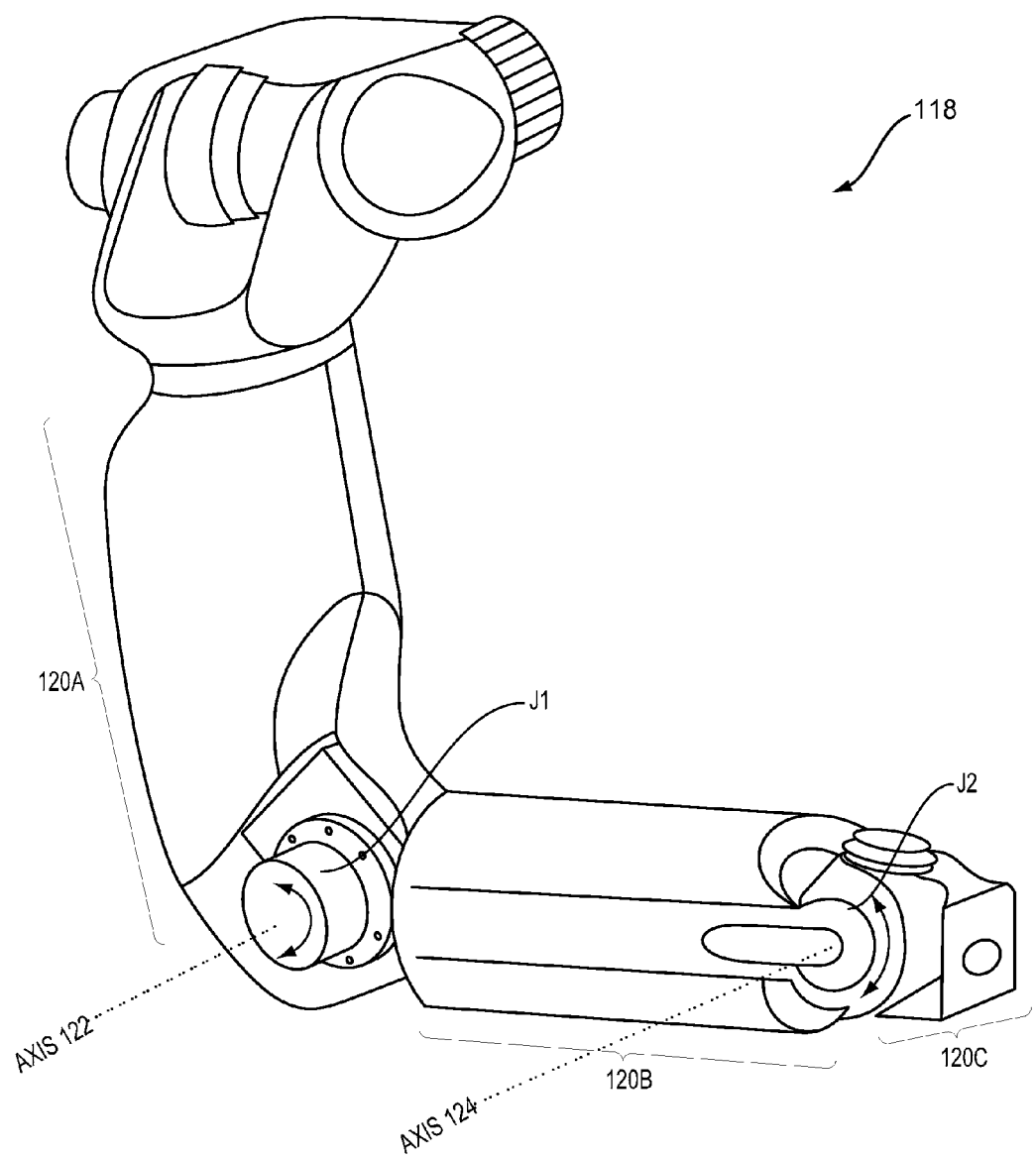

A robotic system 100 may take on various forms. To illustrate, refer to FIG. 1B showing an example robotic arm 118. As shown, the robotic arm 118 includes movable component(s) 116 such as appendages 120A, 120B, and 120C, among others. Additionally, the robotic arm 118 includes joints J1 and J2, each coupled to one or more actuators (not shown) such as actuator(s) 114. The actuators in joints J1 and J2 may operate to cause movement of various movable component(s) 116 such as appendages 120A, 120B, and 120C. For example, the actuator in joint J1 may cause movement of appendage 120B about axis 122 (e.g., resulting in rotation about an axis of joint J1). Whereas, the actuator in joint J2 may cause movement of appendage 120C about axis 124 (e.g., resulting in rotation about an axis of joint J2). Other examples may also be possible.

FIG. 2A is a block diagram showing components of an example computing device 200 that includes one or more processors 202, data storage 204, program instructions 206, power source(s) 208, sensors 210, display 212, and Input Method Editor (IME) 214. Note that the computing device 200 is shown for illustration purposes only and computing device 200 may include additional components and/or have one or more components removed without departing from the scope of the disclosure. Further, note that the various components of computing device 200 may be arranged and connected in any manner.

Display 212 may take on any form (e.g., LED, LCD, OLED, etc.). Further, display 212 may be a touchscreen display (e.g., a touchscreen display on a tablet). Display 212 may show a graphical user interface (GUI) that may provide an application through which the user may interact with the systems disclosed herein.

Further, the computing device 200 may receive user input (e.g., from the user of the computing device 200) via IME 214. In particular, the IME 214 may allow for interaction with the GUI such as for scrolling, providing text, and/or selecting various features of the application, among other possible interactions. The IME 214 may take on various forms. In one example, the IME 214 may be a pointing device such as a computing mouse used for control of the GUI. However, if display 212 is a touch screen display, user touch input can be received (e.g., such as using a finger or a stylus) that allows for control of the GUI. In another example, IME 214 may be a text IME such as a keyboard that provides for selection of numbers, characters and/or symbols to be displayed via the GUI. For instance, in the arrangement where display 212 is a touch screen display, portions of the display 212 may show the IME 214. Thus, touch-input on the portion of the display 212 including the IME 214 may result in user-input such as selection of specific numbers, characters, and/or symbols to be shown on the GUI via display 212. In yet another example, the IME 214 may be a voice IME that may be used that receives audio input, such as from a user via a microphone of the computing device 200, that is then interpretable using one of various speech recognition techniques into one or more characters than may be shown via display 212. Other examples may also be possible.

Figure 2B:
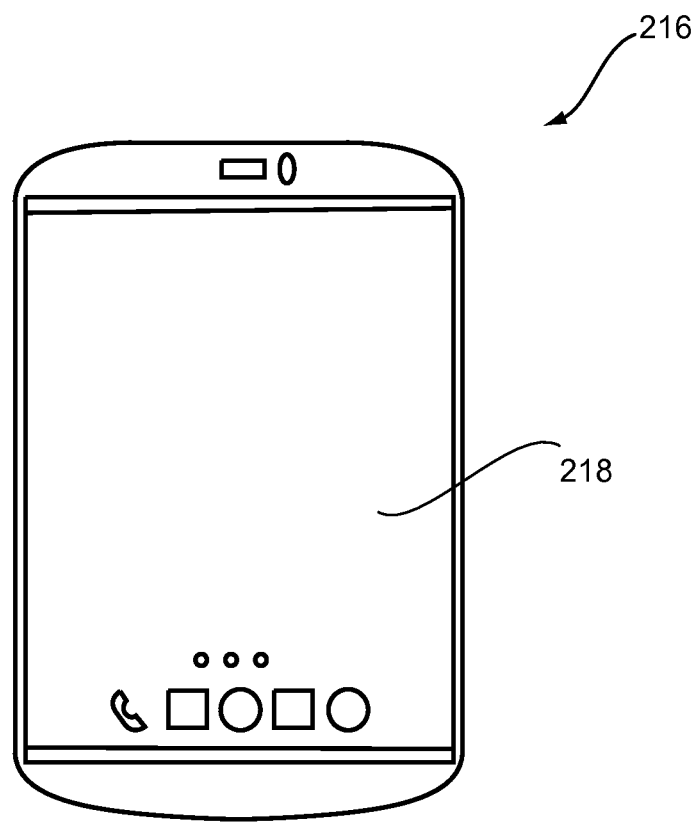

A computing device 200 may take on various forms. For instance, the computing device 200 may take the form of a desktop computer, a laptop, a tablet, a wearable computing device, and/or a mobile phone, among other possibilities. To illustrate, refer to FIG. 2B showing an example tablet 216. As shown, the tablet 216 includes touch-screen display 218 that is configured to display a GUI and receive user-input such as by way of one or more touch gestures provided by a user of the tablet 216. Note that the tablet may also include other components not shown and described herein.

Figure 3A:
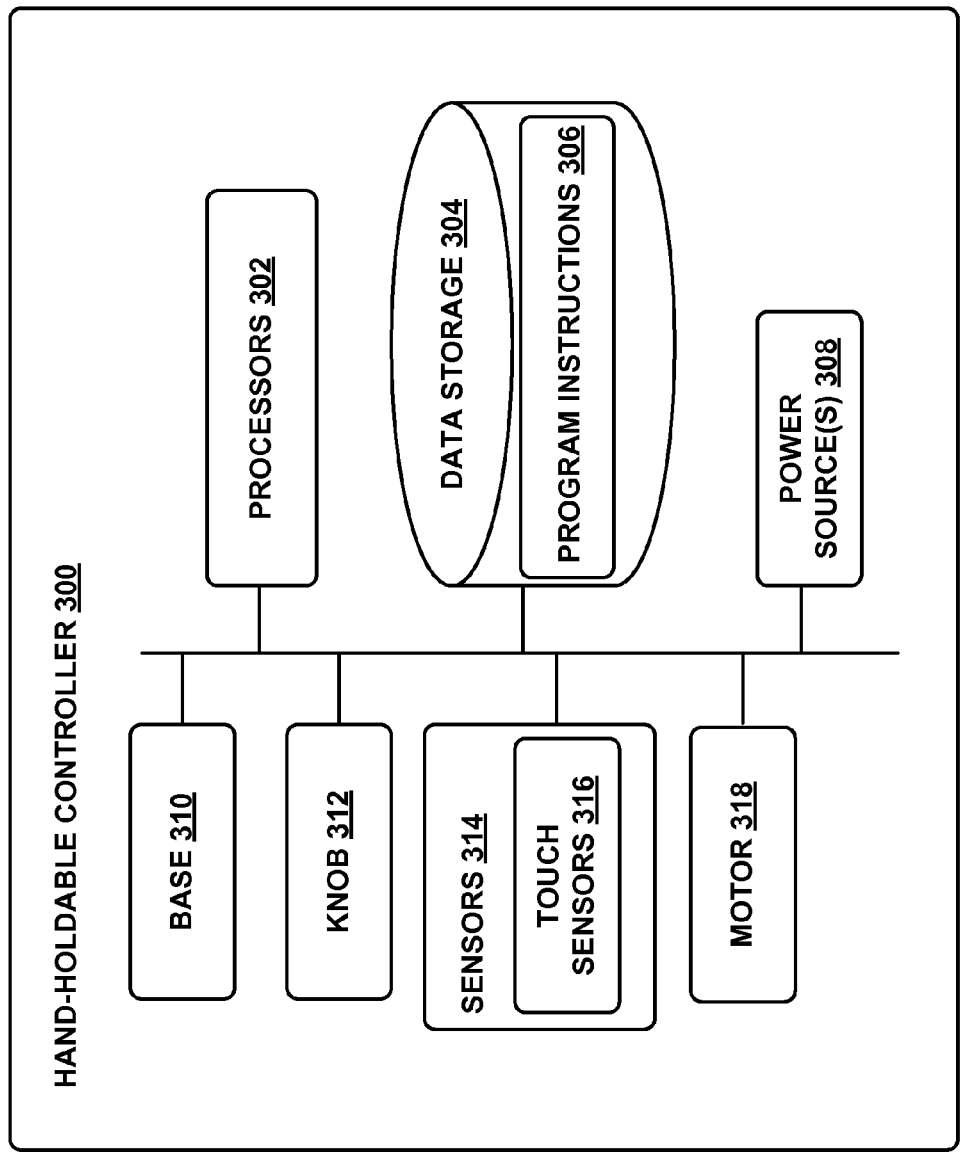
FIGS. 3A, 3B, 3C, and 3D illustrate an example hand-holdable controller, according to an example implementation.
Figure 3B:
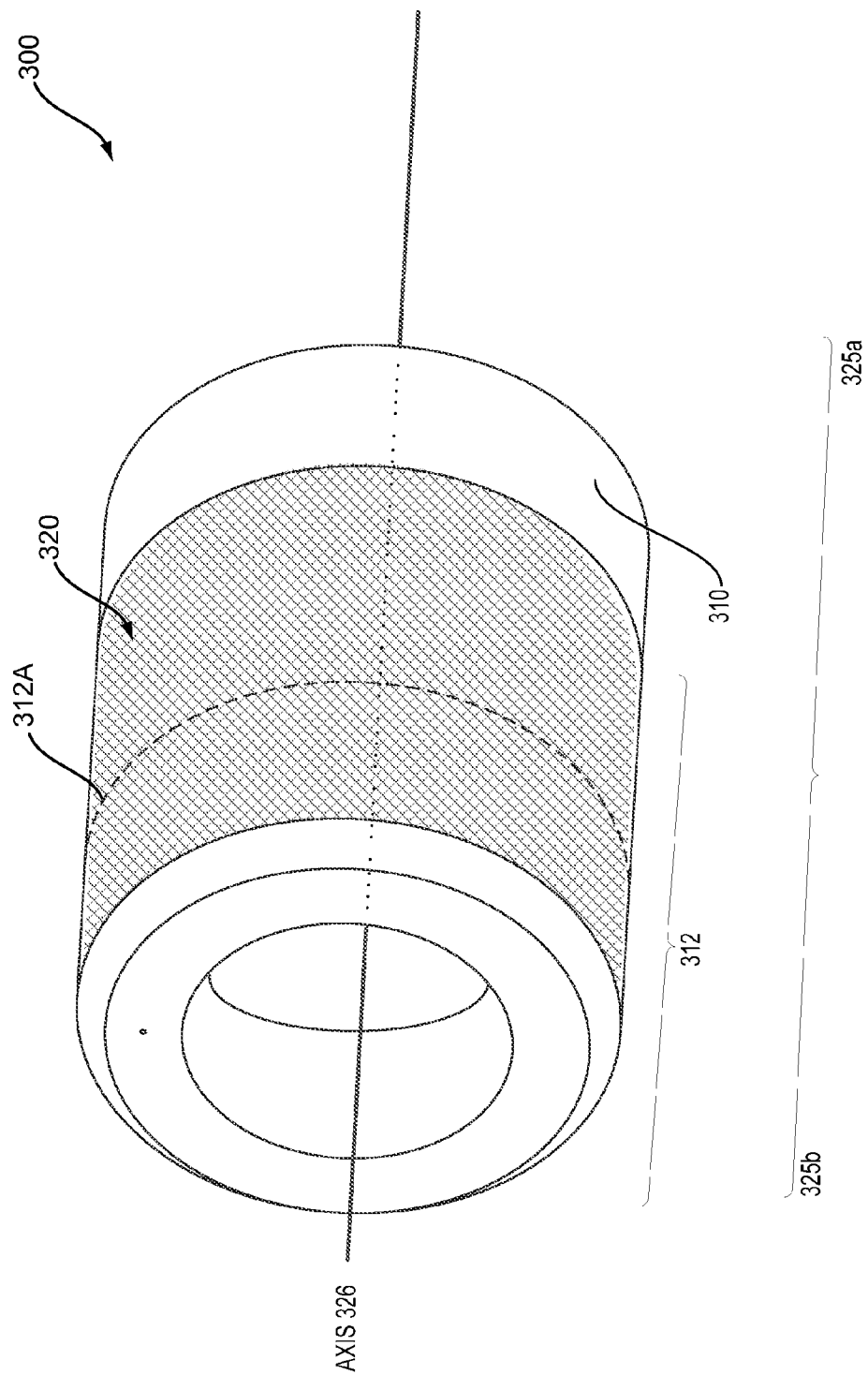

FIG. 3A is a block diagram showing functional components of a haptic hand-holdable controller 300, according to an example implementation. FIG. 3B is an illustration showing one possible implementation of a hand-holdable controller 300, which may include some or all of the components shown in FIG. 3A. A haptic hand-holdable controller 300 may also be referred to herein as a hand-holdable controller, a hand-holdable-controller system, a controller system, a wireless controller, or simply as a controller. In an example implementation, the components shown in FIG. 3A may be part of a hand-holdable controller with a motorized knob, which can also receive input via a curved touchpad on its outer surface. Other implementations, which utilize other components, are also possible.

In FIG. 3A, the hand-holdable controller 300 is shown to include one or more processors 302, data storage 304, program instructions 306, power source(s) 308, a base 310, a knob 312, sensors 314 such as touch sensors 316, and a motor 318. Note that the hand-holdable controller 300 is shown for illustration purposes only and hand-holdable controller 300 may include additional components and/or have one or more components removed without departing from the scope of the disclosure. Further, note that the various components of hand-holdable controller 300 may be arranged and connected in any manner.

Base 310 may be arranged so as to allow a user to grasp onto (e.g., hold) the hand-holdable controller 300 with one hand, while rotating the knob 312 with their other hand. Such a base 310 may be any shape, size, and/or form. Additionally or alternatively, the base 310 may be arranged to be positioned on and/or coupled to a surface or a robot joint (or another entity). With this arrangement, the user would not necessarily have to grasp onto the base 310 (e.g., so as to hold the controller 300) and could thus rotate the knob 312 with the controller 300 essentially positioned on and/or coupled to the entity. In a further aspect, this base 310 may be coupled to one or more other components of the hand-holdable controller 300, and/or may be integrated as part of a controller housing (e.g., that extends into a center cavity in the knob 312 such that the knob 312 can rotate about the portion of the housing that extends from the base 310).

Rotatable knob 312 can take on various forms, such as the cylindrical form shown in FIG. 3B, or a conical form, among other possibilities. References herein to a "cylindrical" knob or other "cylindrical" components of the controller should be understood to encompass cylindrical, conical and other forms of the knob 312 and/or other component. With such example arrangements, the controller 300 may be thus configured so that a user can provide input to the controller 300 by way of rotating the knob 312 about (e.g., relative to) the base 310. For example, the degree and/or speed of rotation of the knob 312 may provide input for control of, e.g., a robotic device.

The hand-holdable controller 300 may additionally or alternatively include other tactile sensors. For example, hand-holdable controller 300 may include any sensor that generates information arising from physical interaction with the environment of the hand-holdable controller 300, such as capacitive sensors, positional feedback sensors, pressure sensors, proximity sensors, strain gauges, force sensors, temperature sensors, magnetic sensors, or others. For example, the hand-holdable controller 300 may include a proximity sensor (e.g., a Hall-effect sensor or an infrared sensor) to detect the presence of objects near the hand-holdable controller 300 but that are not in contact with the hand-holdable controller 300.

In some implementations, the hand-holdable controller 300 may not include any mechanical or structural interface features (e.g., mechanical buttons, switches, jacks, connectors, or controls), other than the knob 312. In such an implementation, the rotation of the knob 312 and tactile or touch input may be the only forms of user input that are possible via the controller 300. Alternatively, the hand-holdable controller 300 may include other interface features (not shown in the Figures) in addition to the knob 312. For example, the hand-holdable controller 300 may include a power switch or button, or other buttons, switches, jacks, connectors, or controls for providing input via the hand-holdable controller 300.

Further, the hand-holdable controller 300 may include one or more touch sensors 316. The touch sensors 3015 may be capacitive touch sensors, among other possibilities. The touch sensors 316 may be positioned and/or integrated within the knob 312 and/or within other components of the hand-holdable controller 300. For instance, the touch sensors 316 may be arranged to detect touch on one or more surfaces of the knob 312. To do so, the touch sensors 316 could, for example, take the form of a curved touchpad arranged along at least a portion of the one or more surfaces. With such example arrangements, touch data received via these touch sensors 316, such as during rotation of the knob 312, may be used to control various aspects of the robotic system 100 (e.g., via the computing device 200) and/or various aspects of the computing device 200 as further discussed below.

As shown in FIG. 3B, touch sensors may be arranged to provide a curved touchpad 320, which may also be referred to as a cylindrical touch surface. In FIG. 3B, the cylindrical touch surface 320 is indicated by the crosshatch pattern on the surface of the knob 312. Further, in some implementations, the cylindrical touch surface 320 can extend around the entire outer surface of the knob (or portions thereof), such that the touch surface is a full cylinder (e.g., with no gaps in touch sensing anywhere in the circumference of the knob 312).

In an example embodiment, knob 312 is motorized. In other words, the handheld controller 300 may include at least one motor 318 that is operable to apply torque to knob 312. The motor 318 may be a brushed DC motor, a brushless DC motor, or an AC motor such as a synchronous electric motor or an induction motor, among other possibilities. Additionally, the motor 318 may include a motor shaft, a stationary stator, and a rotor coupled to the motor shaft such that the motor shaft is configured to deliver mechanical power to, for instance, a transmission assembly, thereby causing a rotation of the transmission assembly (which may be coupled to knob 312).

More specifically, the shaft of motor 318 may operably connected to the knob 312 and/or to a control component, such that the control component can receive an electrical input signal to control the rotation of the shaft (and thus the knob 312 as well). Alternatively, the knob 312 may be connected directly to the control component (e.g., not by way of a shaft), among other possible arrangements. For example, a slip ring or rotary transformer may be used to couple electrical signals between two parts that rotate in relation to each other, and thereby to power the rotatable portion of the hand-holdable controller 300 (e.g., to rotate the knob 312).

With the above example arrangement, the at least one motor 318 is controllable in order to vary the amount, and possibly the direction, of the torque that is applied to the knob 312. In particular, motor 318 may be operable to affect and/or resist rotation of the knob 312. For instance, the motor 318 may provide haptic feedback and/or change the "feel" of the knob 312 by applying torque to the knob in a clockwise or counter-clockwise direction. By way of example, the motor may be operable to, e.g., make rotation of the knob 312 by the user more or less difficult, to back drive a hand of a user holding the knob by way of rotational feedback, to rotate the knob 312 without additional torque being applied by a user, to replicate the feel of detents or clicks during the rotation of the knob, and/or to provide vibrational feedback, among other possibilities.

In a specific example, the controller 300 may control a joint of robotic system 100 (e.g., via computing device 200 as discussed below). In this example, the motor 318 could resist (or back drive) rotation of the knob 312 in response to a determination (e.g., by the computing device 200) that a moveable component coupled to the joint is entering a non-permissible zone (e.g., unsafe zone), such as within a threshold distance of a human for instance. Other examples are also possible.

In a further aspect, the hand-holdable controller 300 may also include (i) potentiometers and/or variable capacitors that could be used for applications such as determining a rotary position of the knob 312 as the knob 312 rotates due to torque from the motor 318 and/or due to an external torque and/or (ii) a rotary switch that could be used to change configuration (e.g., power on or off) of the controller 300 in accordance with rotation of the knob 312 due to torque from the motor 318 and/or due to an external torque, among other components.

As noted above, FIG. 3B shows an example implementation of a hand-holdable controller 300. As shown, the example hand-holdable controller 300 includes a base 310, a knob 312, and a motor (not shown) as well as any of the components discussed above in the context of hand-holdable controller 300. The controller 300 may have a proximate end 325a that is near the base 310 (illustrated in FIG. 3B near the bottom of the base 310) and a distal end 325b (illustrated in FIG. 3B near the top of the knob 312). The knob 312 may rotate or be rotated clockwise and/or counterclockwise about axis 326 in order to control a robotic system or a component thereof in various ways.

Further, touch data (or tactile data) may be received, during the rotation of the knob 312 or while the knob 312 is stationary, from one or more sensors (e.g., touch sensors 316 or tactile sensors) positioned on one or more surfaces of the knob 312. This touch data may affect the manner the robotic system 100 is being controlled. To illustrate, refer to example FIGS. 3C-3D showing different hand positions on the example hand-holdable controller 300.

Figure 3C:
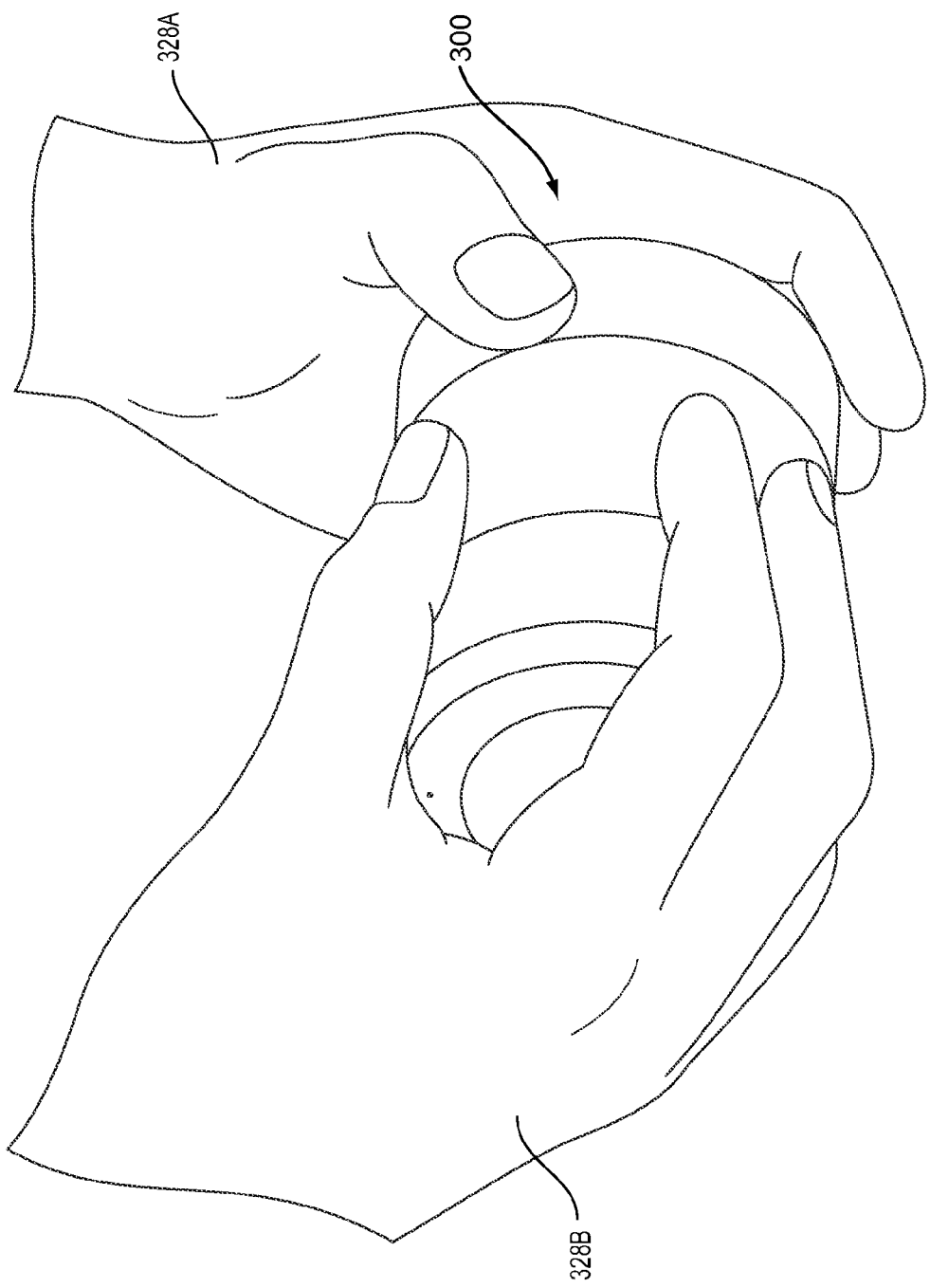

FIG. 3C shows a hand 328A of a user grasping onto the base 310 of the hand-holdable controller 300 such as for the purpose of holding onto the hand-holdable controller 300. Whereas, the other hand 328B of the user grasps onto the knob 312 such as for the purpose of providing user-input by rotation and/or touch of the knob 312. As shown, the hand 328B grasps onto a relatively large surface area of the knob 312 such as by several fingers as well as the palm on the surface area of the knob 312. The touch sensors may detect this particular touch gesture (e.g., this touch gesture may be referred to as a "full grip" or "full grasp") by the user and may provide corresponding touch data representing this particular touch gesture.

Figure 3D:
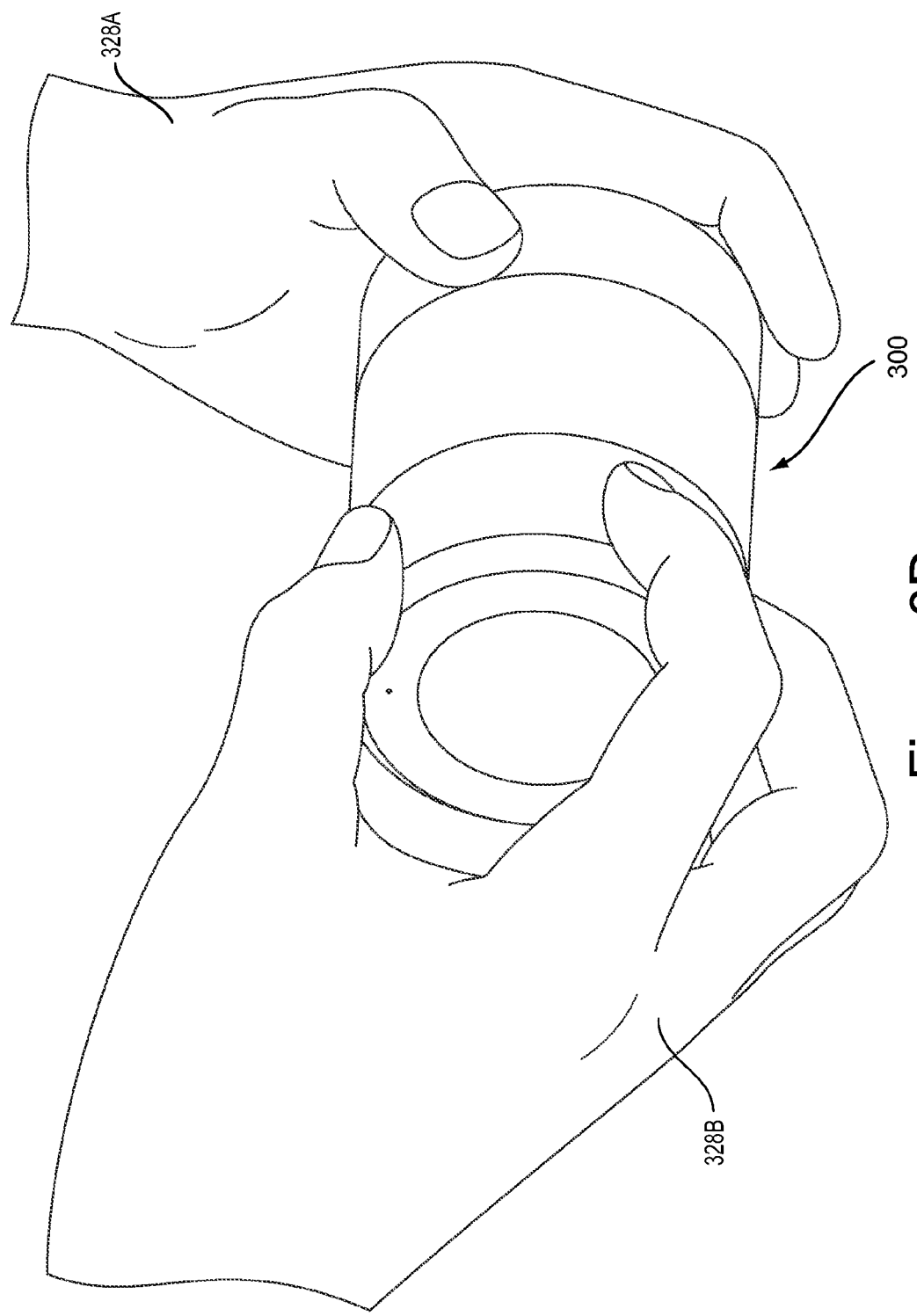

In contrast, FIG. 3D shows the hand 328A of the user grasping onto the base 310 in the same manner as in FIG. 3C. However, in this case, the other hand 328B of the user grasps onto a relatively small surface area of the knob 312 such as by placing only fingertips on the surface area of the knob 312 close to the distal end 325b. The touch sensors may detect this different particular touch gesture (e.g., this touch gesture may be referred to as a "fingertip grip" or "fingertip grasp") by the user and may provide different corresponding touch data representing this different particular touch gesture. As such, the touch illustrated in FIG. 3D may result in different control functionality of the robotic system 100 (and/or the computing device 200) than the touch illustrated in FIG. 3C. Moreover, different touch gestures may result in different control functionality even if the characteristics of the rotation of the knob 312 (e.g., amount and/or speed of rotation) are the same across different touch gestures and/or even if the component being controlled is the same across different touch gestures.

Many other example touch gestures (e.g., actions which may generate touch data, such as gestures, grips, grasps, touches, and/or other tactile information) may also be possible without departing from the scope of the disclosure. For example, the hand 328A of the user may grasp onto base 310 in the same manner as in FIGS. 3C and 3D. However, other touch gestures may include one or more of (i) a palming, (ii) a partial grip (with finger extension or retraction), (iii) a multi-finger sequence, (iv) a multi-touch, (v) a drag, (vi) a side surface hold, (vii) a side surface swipe, (viii) a fingertip only, (ix) a single tap (possibly at a certain location or within a certain area on the surface of the knob), (x) a double tap (possibly at a certain location or within a certain area on the surface of the knob), and/or (xi) a swipe or swipe pattern (possibly at a certain location or within a certain area on the surface of the knob), among other possibilities.

As one specific example, a palming grip may entail the palm of hand 328B to be placed on the top of the knob 312 (e.g., at the top of the proximate end 325a of hand-holdable controller 300). For example, an intuitive use of the palming grip may be as an indication of a stop command. Thus, the hand-holdable controller 300 may interpret touch data indicative of a palming and issue a stop command to the computing device 200 or robotic system 100 (or the hand-holdable controller 300 may send the palming touch data to the computing device 200, which in turn sends a command to stop the robotic system 100 from performing an action or to stop an action that the robotic system 100 is currently performing).

In another example of touch input, a partial grip may be interpreted from touch data that indicates a touch gesture somewhere between the grips illustrated in FIGS. 3C and 3D. For example, similar to the full grip show in FIG. 3C, all five fingers of hand 328B of the user may be used to grasp the hand-holdable controller 300 but, for the partial grip, those fingers may be placed closer to the distal end 325b (e.g., above the dividing line 312A of the knob 312 illustrated in FIG. 3B). In the partial grip (although applicable to other grips as well), touch input related to a finger refraction or finger extension may be used to generate touch data. For example, sensors (such as touch sensors 316) may detect a finger retraction (e.g., one or more fingers of hand 328B sliding or moving towards the distal end 325b of hand-holdable controller 300) or a finger extension (e.g., one or more fingers of hand 328B sliding or moving towards the proximate end 325a of hand-holdable controller 300). This finger retraction or extension may vary the commands sent to the robotic system 100. For example, a partial grip plus a finger extension may send control signals of increased magnitude as the fingers extend further. Likewise, a partial grip plus a finger retraction may send control signals of decreased magnitude as the fingers retract further. Other example touch gestures are possible and may be programmable (e.g., via IME 214 or other hardware or software).

Alternatively, a partial grip may be defined in other ways. For example, a partial grip may be defined as a full grip minus one or more pieces of touch input (e.g., touch input indicative of five (or less) fingers with no touch input indicative of a palm on top of knob 324).

Touch gestures can be used in combination to vary the control signals sent to the robotic system 100. For example, a full grip being performed simultaneously with a rotation of the knob 312 may actuate a joint at a high speed. By adding in a touch gesture (e.g., a fingertap) to the full grip and rotation, the control signal may be varied. For example, the speed or magnitude of the control signal may be varied. Similarly, a different component may be controlled by the additional touch gesture (e.g., the fingertap may generate a control signal to close a gripper).

Other examples of touch input that may be used to generate touch data include, for example, a multi-touch (e.g., a combination of touches, such as a full grip followed by a palming, a drag (e.g., an identified grip followed by a dragging motion), a side surface hold (e.g., two fingers of hand 328B placed and held alongside knob 312), and a side surface swipe (e.g., two fingers of hand 328B placed alongside knob 312 and swiped in a clockwise manner). Of course, many other examples of touch input are possible. Also, note that feedback (e.g., vibrational feedback, clicks, detents) could be provided by the controller 300 in response to transitions between such touch inputs.

Figure 4:
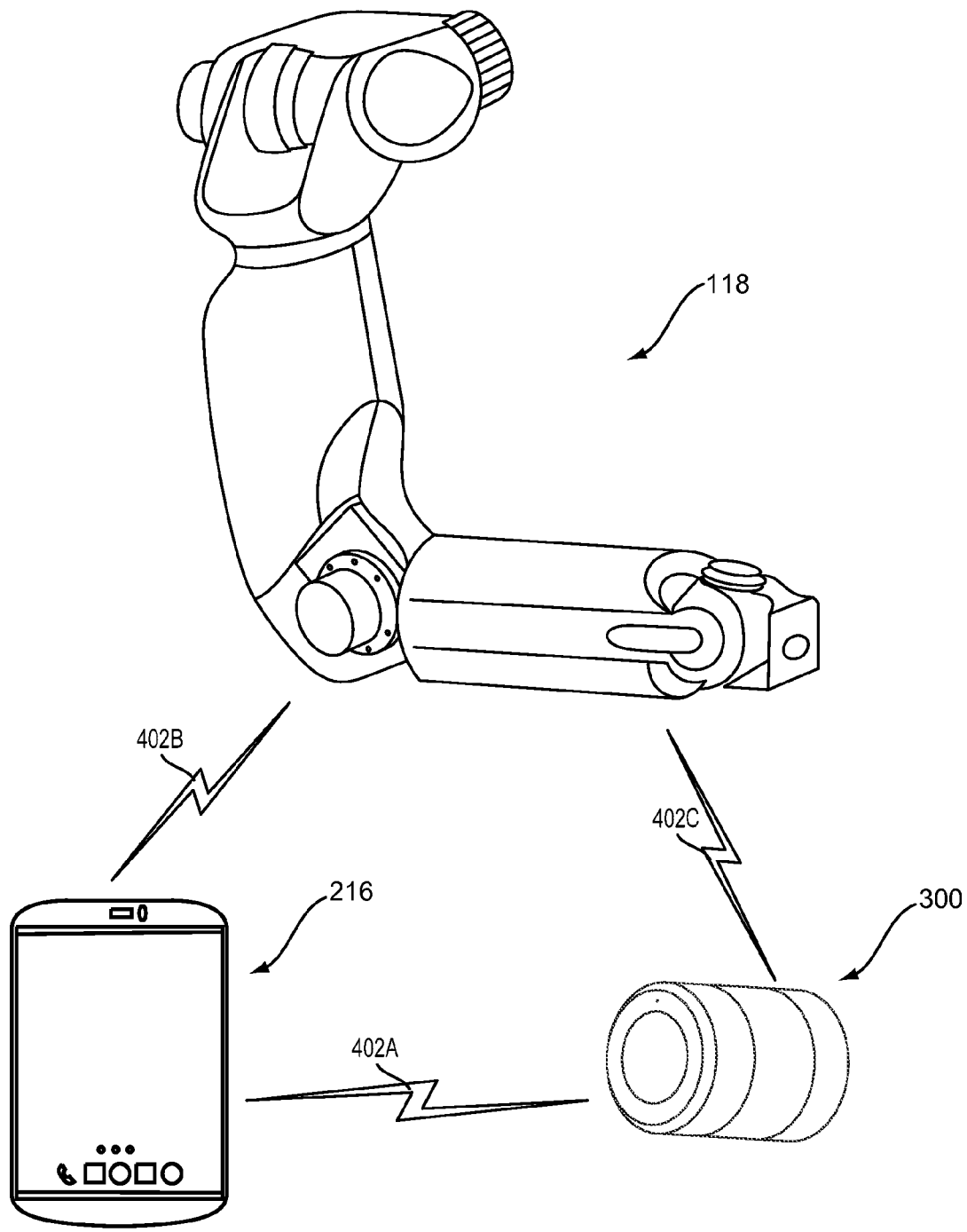
FIG. 4 illustrates example communication links, according to an example implementation.

Robotic system 100, computing device 200, and/or hand-holdable controller 300 may communicate with each other in various ways. To illustrate, refer to FIG. 4 showing an example arrangement 400 including communication links 402A, 402B, and 402C that provide for exchange of information between the various systems. For instance, communication link 402A provides for communication between example hand-holdable controller 320 and tablet 216, communication link 402B provides for communication between tablet 216 and robotic arm 118, and communication link 402C provides for communication between robotic arm 118 and example hand-holdable controller 320. Note that other arrangements may also be possible as some communication links may be removed and other communication links may be added such as for communication with other devices not discussed herein.

Communication links 402A, 402B, and 402C may include wired links and/or wireless links (e.g., using various wireless transmitters and receivers). A wired link may include, for example, a parallel bus or a serial bus such as a Universal Serial Bus (USB). A wireless link may include, for example, Bluetooth, NFC, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

According to an example implementation, the hand-holdable controller 300 may detect a rotation of the control knob (e.g., knob 312), and may indicate that rotation of the knob to the computing device 200. Additionally or alternatively, the hand-holdable controller 300 may provide output data to a controller application running on computing device 200, which is indicative of detected touch data (e.g., during rotation of the knob). As such, the computing device 200 may determine the rotation of the knob 312 and/or touch gestures performed on the knob 312, and may responsively generate corresponding control signals for another device (e.g., robotic system 100) in accordance with the rotation and/or detected touch.

To control a device, such as robotic system 100, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As discussed, these particular operations are based on an interpretation of the input data received by the computing device 200 from the hand-holdable controller 300.

In an example implementation, the hand-holdable controller 300 may be configured to receive instructions (e.g., from computing device 200) indicating an operational mode for the hand-holdable controller 300 (e.g., for the rotatable knob 312), so as to essentially load the operational mode onto the controller 300. Such an operational mode may define operational parameters of the motor (e.g., motor 318) of the hand-holdable controller 300. As such, different operational modes may provide different "feels" to the knob by varying the haptic characteristics of the knob 312. In particular, different "feels" can be provided by varying the torque applied to the knob as it rotates and/or otherwise varying when and how torque is applied to the knob 312 and/or by varying the type (or type of control) of motor 318 (e.g., by using a position rotation motor, a continuous rotation motor, a linear motor, etc.).

For example, a given operational mode may specify a specific amount of turning resistance, or in other words, a specific amount of torque that counters rotation by the user (making it harder or easier for the user to turn the knob). In another example, an operational mode may specify rotationally-varying torque functions, which vary the amount of resistance and/or assistance by the motor as a function of the knobs position (e.g., as a function of the degrees of rotation from a base orientation of the knob). Such torque functions can be visually described and loaded to the controller from a graphic card.

In another aspect, a given operational mode may specify a range of rotation to which the knob 312 is restricted. To do so, an operational mode may define the number of degrees of rotation from a base orientation that are permissible in one or two directions. For example, an operational mode may limit rotation to within plus or minus 45 degrees from a center point. Other examples are also possible.

In yet another aspect, a given operational mode may set limits on the speed at which the knob can turn. For instance, a given operational mode may set a maximum or minimum number of degrees per second. Further, in some implementations, an operational mode may vary the maximum or minimum speed of rotation as a function of the number of degrees the knob has rotated from a base orientation.

In yet another aspect, a given operational mode may indicate whether or not to apply a return-to-center function, which returns the knob to a base orientation when certain conditions are met. For example, a return-to-center function may rotate the knob back to a base orientation whenever input data from the touch sensors on the knob indicates that the user has released the knob. As another example, a return-to-center function may only respond to release of the knob by rotating the knob back to the base orientation in certain orientations of the knob (e.g., when the knob has been rotated by at least some threshold amount from the base orientation, or when the knob has reached a rotation limit).

In yet another aspect, a given operational mode may specify certain orientations or a certain range of rotation during which free spin of the knob should be allowed. In particular, when the knob is put in a free-spin mode, the motor may be disabled such that the knob is allowed to rotate freely about the stator of the motor. An operational mode may also specify certain trigger events that trigger the enabling or disabling of free-spin mode. For example, an operational mode could define a certain touch gesture or gestures that enable and/or disable the free-spin mode. Other examples are also possible.

Other haptic parameters may also be adjusted or set by a given operational mode. For example, the hand-holdable controller may be configured to provide a variable resistance through customizable arc sizes of various sizes. As a specific example, a full (or partial) rotation of the knob could be divided into a variable number of arcs, and each arc could be of various sizes. Each of the variable number of arcs could be defined to have a specific feel (e.g., one or more operational modes, such as resistance levels, speed, detents or no detents, etc.). Other examples are also possible.

In a further aspect, an operational mode may also specify how touch input that is received via a knob controller should be interpreted and/or translated into control signals for a robot system. For example, an operational mode may define one or more touch gestures that are available for use in the operational mode, and how these touch gestures should be interpreted. Various types of touch gestures may be defined and mapped to control functions, depending upon the particular implementation.

In some cases, an operational mode may define one or more touch gestures that can be used to switch from the operational mode to one or more other operational modes. Additionally or alternatively, touch gestures that place a knob controller into a given operational mode may be defined globally, such that the controller can be placed into the given operational mode from any other operational mode. In either case, touch gestures may be used to vary the feel of the knob as it is rotated, and/or to vary manner in which rotation of the knob 312 is interpreted into robot control signals. For instance, control signals sent via rotation of the knob may vary based on different manners in which a user gestures or grasps the knob 312 and/or may vary based on the location of the touch gesture along the one or more surfaces of the knob 312, among other possibilities.

III. Examples of Graphic Cards Describing Operational Modes

Figure 5A:
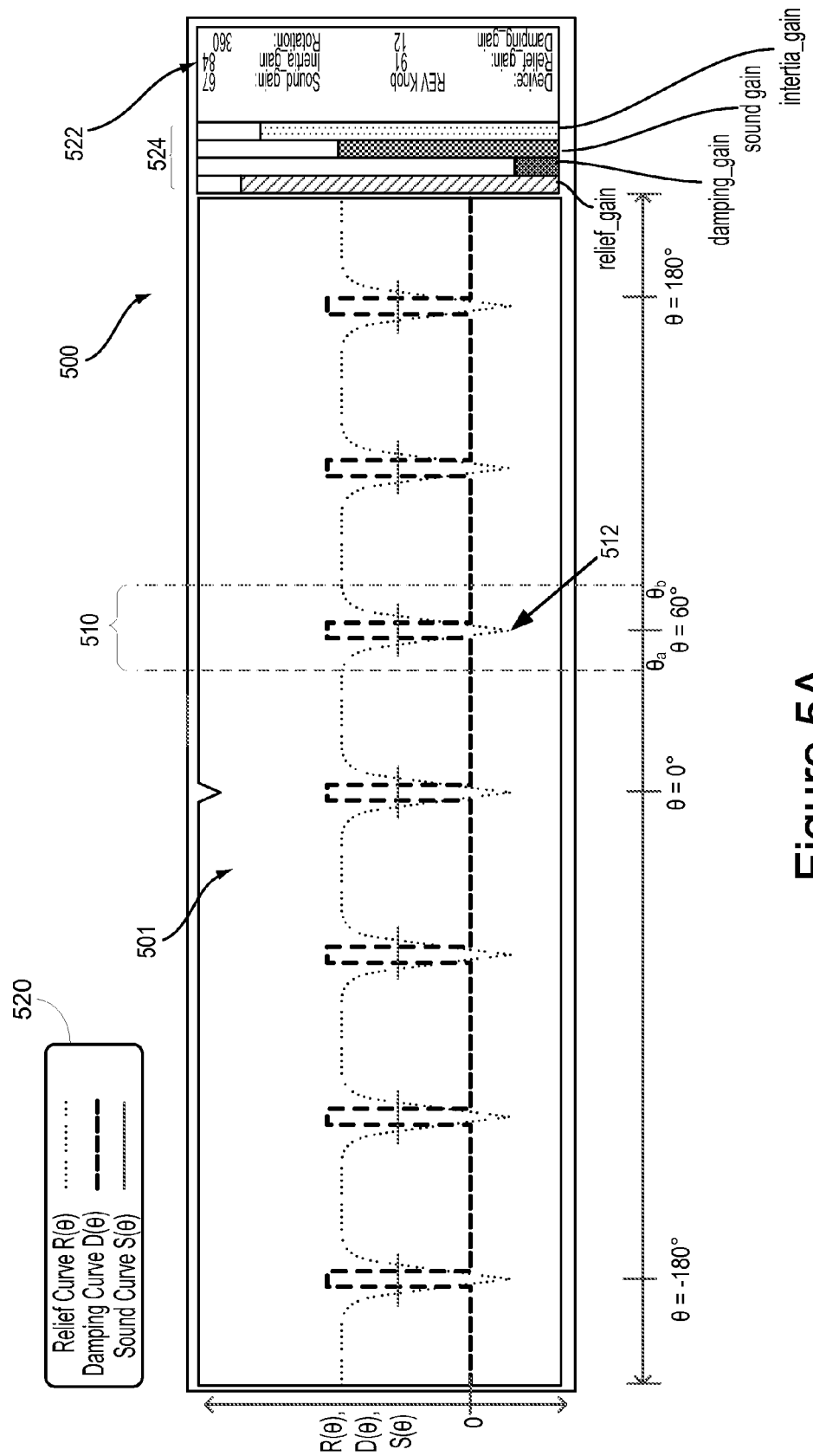
FIGS. 5A to 5C are illustrations of graphic cards according to example embodiments.

As noted above, a graphic card or "paint chip" may visually describe an operational mode of haptic knob controller, which can be loaded to the controller. FIG. 5A shows a graphic card 500 according to an example embodiment. Each curve on the graphic card 500 describes a rotationally-varying parameter for a rotatable interface component, as a function of the position (e.g., rotation) of the rotatable interface component. As such, the curves on graphic card 500 (and possibly other information from the graphic card and/or other sources) may collectively describe an operational mode for a rotatable interface component, such as the haptic knob controller shown in FIGS. 3A to 4.

Note that for simplicity, examples herein may refer to the rotatable interface component as being a haptic knob controller, such as that shown in FIGS. 3A to 4. It should be understood, however, a paint chip could describe an operational mode for other types of interface components, as well. Generally, a "rotatable interface component" should be understood to be any motorized rotatable component, which can be manually rotated by a user, such that varying the torque that is applied to the component by the motor can vary how rotation of the component feels to user. For example, a rotatable motorized joint on a robot could be considered an interface component, since a user could manually move the joint and feel the resistance/assistance of the motor as they do so. Other examples are also possible.

In FIG. 5A, graph feature 501 of card 500 shows a number of curves, which each portray a rotationally-varying parameter as a function of position of the knob. Accordingly, the horizontal axis of the graph feature 501 may span the rotational range of a knob when the corresponding operational mode is loaded to the knob. For example, graph feature 501 may be understood to visually describe an operational mode that is defined for slightly more than 360 degrees of rotation (e.g., slightly more than 180 degrees of rotation to either side of a base position at 0 degrees). The vertical axis of graph feature 501 may indicate a value of each parameter curve. Note that the scale of the vertical axis of graph feature 501 may be the same for two or more of the curves, and may also differ between curves, depending upon the particular implementation.

Further, the curves on graphic card 500 are visually distinguishable from one another because they are shown using different dash patterns (e.g., as shown by legend 520). While it is possible that curves for various rotationally-varying parameters may be distinguished in this manner, the curve for each rotationally-varying parameter may additionally or alternatively be shown on a graphic card in a different color, so that the plot for each parameter can be quickly recognized by the viewer. Other techniques for visually distinguishing each curve are also possible.

In an example embodiment, paint chips could utilize an RGB color system, in which: (i) a red curve $R(\theta)$ on the graph indicates a relief value as a function of knob rotation (e.g., from a base position) (ii) a green curve $D(\theta)$ indicates a damping value of the knob as a function of knob rotation, and (iii) a blue curve $S(\theta)$ indicates a sound parameter (e.g., frequency of sound resulting from the motor's operation) as a function of knob rotation. Accordingly, when a control system, such as a phone, tablet, or the controller itself, detects the paint chip shown in FIG. 5A, the control system may adjust the operational mode for the knob controller such that the applied torque from the motor varies according to the relief curve $R(\theta)$, the dampening curve $D(\theta)$, and sound curve $S(\theta)$.

It should be understood that different colors may be utilized for the curves representing these and other parameters, without departing from the scope of the invention. Yet further, different combinations of rotationally-varying parameters may be shown on a graphic card. For instance, a graphic card may include curves for more or less parameters, and may additionally or alternatively include curves for rotationally-varying parameters other than those shown in FIG. 5A, without departing from the scope of the invention.

A. Torque Contributions Corresponding to Parameter Curves

In an example embodiment, at least one torque contribution function may be defined in association with each curve on the graphic card. These torque contribution functions may each indicate an amount of torque for a corresponding parameter indicated by the curve, and thus may be summed to determine the amount of torqe as a function of the position of the knob (and possibly as a function of other factors as well). For example, in FIG. 5A, a relief torque contribution function $T_{relief}(\theta)$ may be defined for $R(\theta)$. Further, a damping torque contribution $T_{damp}(\theta)$ may both be defined in part by the damping curve $D(\theta)$. Yet further, an audible torque contribution function $T_{sound}(\theta)$ may be based on the sound curve $S(\theta)$.

Further, the torque contribution functions corresponding to the curves shown on the card, may collectively provide a torque function $T(\theta)$, which indicates the total torque that the motor applies to the knob as a function of the knob's position (and also the knob's velocity and/or acceleration, in some cases). For example, the torque function $T(\theta)$ corresponding to the graphic card 500 may be defined as:

$$T(\theta) = T_{relief}(\theta) + T_{damp}(\theta) + T_{inertia}(\theta) + T_{sound}(\theta)$$

More generally, the torque function $T(\theta)$ may be a sum of the torque contribution functions corresponding to parameters indicated by the curves on a graphic card. Of course, a torque function may be defined in other ways as well.

Referring now to the relief curve $R(\theta)$ in greater detail, this curve may visually indicate relief torque as function of position. The relief torque contribution function may be defined so that a positive value of $T_{relief}(\theta)$ indicates relief torque in a clockwise direction. In other words, a positive value of $T_{relief}(\theta)$ assists clockwise rotation of the knob by the user (and resists counter-clockwise rotation by the user). Correspondingly, a negative value of $T_{relief}(\theta)$ may be defined as applying torque in a direction that resists clockwise rotation of the knob by the user (and assists counterclockwise rotation by the user). Note that visually, clockwise rotation of the knob may be mapped to left-to-right movement on the graph shown on graphic card 500 (e.g., from 0° to 180°), while counter-clockwise rotation of the knob may be mapped to right-to-left movement on the graph shown on graphic card 500 (e.g., from 0° to −180°). Of course, in other embodiments, the directional conventions that are used in the examples provided herein may be reversed.

The relief torque contribution function $T_{relief}(\theta)$ may be defined in various ways. Generally, $T_{relief}(\theta)$ may indicate the applied torque contribution that corresponds to $R(\theta)$ at a given position $\theta$ of the knob. In other words, the relief curve $R(\theta)$ may be used as an input to a relief-force torque contribution function $T_{relief}(\theta)$, which varies as a function of the position of the knob. For example, $T_{relief}(\theta)$ may be defined as follows:

$$T_{relief}(\theta) = -dR(\theta)/d\theta * \text{relief\_gain}$$

In this example, the relief torque contribution $T_{relief}(\theta)$ is equal to the inverse of the derivative of $R(\theta)$ with respect to the position $\theta$ of the knob, multiplied by a "relief_gain" constant. Further, assume in this example that the relief_gain constant is positive. In this case, $T_{relief}(\theta)$ will be positive when the position $\theta$ of the knob corresponds to a downward sloping portion of $R(\theta)$. Thus, at a given position $\theta_n$, a positive value for $T_{relief}(\theta_n)$ means that the relief torque contribution will assist the user in turning the knob clockwise (e.g., in rotating the knob in a direction that corresponds to movement from left to right on the $\theta$-axis of card 500). Therefore, as a user turns the knob through positions that correspond to a downward sloping portion of the relief curve $R(\theta)$, the relief torque contribution $T_{relief}(\theta)$ will assist or make it easier for the user to turn the knob clockwise (and may tend to increase the assistance by more or less as the slope of $R(\theta)$ becomes more or less negative, respectively), and will resist or make it more difficult for the user to turn the knob counter-clockwise. Thus, the user may perceive a downward sloping portion of $R(\theta)$ as assisting or resisting the user in rotating the knob, depending upon whether the user is rotating the knob clockwise or counter-clockwise, respectively.

Correspondingly, when the position $\theta_n$ of the knob corresponds to part of an upward sloping portion of $R(\theta)$, the value of $T_{relief}(\theta)$ may be negative. Thus, as a user turns the knob through positions that correspond to an upward sloping portion of the relief curve $R(\theta)$, the relief torque contribution $T_{relief}(\theta)$ will assist or make it easier for the user to turn the knob counter-clockwise. Thus, the user may perceive an upward sloping portion of $R(\theta)$ as resisting or assisting the user in rotating the knob, depending upon whether the user is rotating the knob clockwise or counter-clockwise, respectively.

Referring now to the damping curve $D(\theta)$ in greater detail, this curve may visually indicate a damping torque contribution (which may also be characterized as a damping coefficient) as function of the position of the knob. In an example embodiment, the damping torque contribution function $T_{damp}(\theta)$ may be defined to resist rotation of the knob by the user in either direction, and to vary the amount of resistance according to both the velocity at which the knob is rotating and $D(\theta)$. Further, in some embodiments, an inertial torque contribution function $T_{inertia}(\theta)$ may be defined to resist acceleration of the knob in either direction, and to vary the amount of resistance according to both the rate of the knob's rotational acceleration and the value of $I(\theta)$ (as described below). Thus, at a given position $\theta_n$ of the knob, the value of the damping torque contribution function $T_{damp}(\theta_n)$ may be defined by $D(\theta_n)$ and the rotational velocity $(v_n)$ of the knob when it arrives at position $\theta_n$, while the value of the inertial torque contribution function $T_{inertia}(\theta_n)$ may be defined by $D(\theta_n)$ and the rotational acceleration of the knob when it arrives at position $\theta_n$.

In some embodiments, viscous damping may be implemented. In such an embodiment, $T_{damp}(\theta)$ may be defined as follows:

$$T_{damp}(\theta) = -D(\theta) * d\theta/dt * \text{damping\_gain}$$

In the foregoing implementation of $T_{damp}(\theta)$, $d\theta/dt$ is the velocity of the knob, and damping_gain is a predetermined constant (which may or may not be indicated on a graphic card). Thus, at a given position $\theta_n$ of the knob, $T_{damp}(\theta_n)$ will be equal to the inverse of $D(\theta_n)$, multiplied by the velocity of the knob at that time, and multiplied by the damping_gain constant. As such, the damping torque contribution $T_{damp}(\theta)$ will vary according to the value of $D(\theta)$ at a particular position of the knob, and according to the velocity of the knob at the particular position.

Thus, when the knob is being rotated clockwise (which is represented as movement from left to right on graph 500), and is currently at a position on the damping curve $D(\theta)$ that has positive value, the velocity $d\theta/dt$ of the knob will be positive, meaning that $T_{damp}(\theta)$ will be negative. (Note that in some embodiments, $D(\theta)$ may be defined to always be positive.) The negative torque contribution of $T_{damp}(\theta)$ will be added the total applied torque $T(\theta)$ and may therefore resist the clockwise rotation of the knob and/or may apply a torque in an opposite direction. Further, when the knob is being rotated counter-clockwise, and is at the same position on the damping curve $D(\theta)$, which has the same positive value, the velocity $d\theta/dt$ of the knob will be negative, meaning that $T_{damp}(\theta)$ will be positive. In this scenario, the positive contribution of $T_{damp}(\theta)$ may increase the total applied torque $T(\theta)$ by resisting the counter-clockwise rotation of the knob.

In the foregoing example, when the value of $D(\theta)$ is positive, the damping force contribution $T_{damp}(\theta)$ will always resist the rotation of the knob, regardless of whether the knob is rotating clockwise or counter-clockwise. Furthermore, the faster the knob is being turned (i.e., the greater the velocity), the greater the resistance that results from the damping torque contribution $T_{damp}(\theta)$ for a given value of $D(\theta)$, and vice versa. Yet further, when the knob is not in motion, $T_{damp}(\theta)$ is equal to zero.

In a further variation not shown in FIG. 5A, a graphic card may include a separate curve $I(\theta)$ for an inertial parameter. In such an embodiment, an inertial torque contribution function $T_{inertia}(\theta)$ may be based on the inertial curve $I(\theta)$ and acceleration of the knob. Of course, an inertial torque contribution function $T_{inertia}(\theta)$ may also be defined in various other ways, without departing from the scope of the invention. In an example embodiment, an inertial torque contribution function $T_{inertia}(\theta)$ may be defined as follows:

$$T_{inertia}(\theta) = -I(\theta) * dd\theta/dt * \text{inertia\_gain}$$

In the foregoing definition of $T_{inertia}(\theta)$, $dd\theta/dt$ is the acceleration of the knob (e.g., the second derivative of the knob's position over time, or $d^2\theta/dt^2$), and inertia_gain is a predetermined constant (which may or may not be indicated on a graphic card). Thus, at a given position $\theta_n$ of the knob, $T_{inertia}(\theta_n)$ will be equal to the inverse of $I(\theta_n)$, multiplied by the acceleration of the knob at that time $(dd\theta/dt)$, and multiplied by an inertia_gain constant. As such, the torque contribution $T_{inertia}(\theta)$ corresponding to the inertia curve $I(\theta)$ (not shown in the Figures) will not only vary according to the value of $I(\theta)$ at a particular position of the knob, but will also vary according to the acceleration of the knob when it reaches the particular position.

For instance, when the knob is accelerating in the clockwise direction and is at a position on the inertia curve $I(\theta)$ that has positive value, $T_{inertia}(\theta)$ will be negative, meaning that the inertial torque contribution will resist the direction that the knob is moving. Practically, the negative value of $T_{inertia}(\theta)$ will increase the total applied torque $T(\theta)$ that is counter to the direction of rotation, which in turn may result in the user perception that the knob is more difficult to turn (or even cause the knob to continue to rotate for a period of time after the user ceases to manually turn the knob). On the other hand, when the knob is decelerating in the clockwise direction and is at a position on the intertia curve $I(\theta)$ that has positive value, $T_{inertia}(\theta)$ will be positive. Thus, the positive value of $T_{inertia}(\theta)$ will increase the total applied torque in the direction of rotation, which in turn may result in the user perception that the knob is easier to turn. Further, when the knob is not in motion or is rotating at a constant speed, $T_{inertia}(\theta)$ will be equal to zero.

As noted above, the torque contributions corresponding to the curves on graphic card 500 may be summed to provide a torque function $T(\theta)$, which indicates the total torque that is applied to the knob by the controller's motor as a function of knob position $\theta$. Thus, as further noted above, using the three torque contribution functions described in the foregoing example, the applied torque function may be defined as: $T(\theta)=T_{relief}(\theta)+T_{damp}(\theta)\ T_{inertia}(\theta)+T_{sound}(\theta)$. In an alternative embodiment, the applied torque function could omit the inertial torque contribution function, and thus could be defined as the sum of $T_{relief}(\theta)$ and $T_{damp}(\theta)$ (and possibly other torque contributions as well).

Referring now to the sound curve $S(\theta)$, this curve may indicate a frequency of the sound that will be emitted by motor, as a function of the position $\theta$ of the knob. For example, higher values of $S(\theta)$ may correspond to higher frequency sounds, while lower values of $S(\theta)$ may correspond to lower frequency sounds. Further, the audible torque contribution function $T_{sound}(\theta)$ may indicate a frequency of oscillation of the motor that produces the audible frequency indicated by the corresponding value of $S(\theta)$. As such, adding the audible torque contribution function $T_{sound}(\theta)$ may result in oscillation of the motor as it applies the torque indicated by the other torque contribution functions, such that the motor will produce the audible frequency indicated by $S(\theta)$ at the same time as it is applying torque according to the other torque contribution functions (e.g., according to the sum of $T_{relief}(\theta)$, $T_{damp}(\theta)$, and $T_{inertia}(\theta)$).

In a further aspect of the above example, the various torque contribution functions included certain constants (e.g., relief_gain, damping_gain, and inertia_gain). In some embodiments, a graphic card may also indicate such constants and/or other global parameters. For example, graphic card 500 includes a global parameter panel 522 indicating values for relief_gain, damping_gain, sound_gain, and inertia_gain. Further, graphic card 500 includes global parameter graphics in the form of parameter meters 524 for relief_gain, damping_gain, sound_gain, and inertia_gain, which are adjacent to the global parameter panel 522. In the illustrated example, each parameter meter 524 indicates a magnitude of the current value for the corresponding parameter, with respect to the total range of possible magnitudes for each parameter. In other words, the more of the parameter meter 524 that is "filled", the closer the card's value of the corresponding parameter is to the maximum value for the parameter.

It should be understood that a graphic card may visually identify global parameters in various other ways, without departing from the scope of the invention. Further, in some embodiments, a graphic card might not include any visual indication of global parameters. Further, it should be understood that other types of global parameters are possible, in addition or in the alternative to those that are shown on graphic card 500.

Note also that global parameter panel 522 includes a "Rotation" parameter, set equal to 360, which may indicate the range of rotation that is represented in the card. In this example, the Rotation parameter indicates that the card defines 360 degrees of rotation (e.g., 180 degrees in either direction from a start point at 0 degrees). Of course, a card may define more or less than 360 degrees of rotation. For example, FIG. 5C is an illustration of a graphic card 580, for which the curves describe 1080 degrees of rotation (e.g., three full rotations of the knob). Other examples are also possible.

In example embodiments, a graphic card may be characterized as describing a particular operational mode of a rotatable interface component, such as haptic knob controller. For example, a given operational mode may include a group of torque contribution functions, such as $T_{relief}(\theta)$, $T_{damp}(\theta)$, $T_{inertia}(\theta)$, and $T_{sound}(\theta)$. Accordingly, a graphic card, such as card 500, may visually describe a particular operational mode by including the curves (e.g., $R(\theta)$, $D(\theta)$, and $S(\theta)$) and global parameters that define the torque contribution functions in the particular operational mode. Other parameters and functionality of an operational mode may also be visually described on a graphic card, in addition or in the alternative to the torque distribution functions described herein.

It should be understood that the graphic cards shown in the figures and described herein are not intended to be limiting, and that other types of graphic cards are also possible within the scope of the claims. In particular, graphic cards of different sizes, shapes, and/or formats are possible, so long as such cards visually describe an operational mode of a rotatable interface component.

B. Visually Representing the "Feel" of a Rotatable Interface Component

As noted, a graphic card, such as card 500, may provide a visual cue that allows users to quickly and easily identify the "feel" of the haptic knob when the corresponding operational mode is loaded to the knob. For example, the particular shape of $R(\theta)$ and $D(\theta)$ in portion 510 of graphic card 500 may be recognized as corresponding to the feeling of a physical detent that mechanically resists or arrests rotation of a knob. For instance, $R(\theta)$ and $D(\theta)$ could be designed to simulate the feel of a detent that is mechanically implemented by spring-actuated lever paired with a notched wheel, or another mechanical arrangement providing detents. Further, since the particular shape of $R(\theta)$ and $D(\theta)$ in portion 510 is repeated once every sixty degrees, the user may recognize card 500 as corresponding to an operational mode where the knob has a simulated detents once every sixty degrees of rotation.

Note that more complex "feels" can also be provided and visually described using graphic cards such as those described herein. For example, graphic cards can be loaded to simulate the feel various surface textures; for example, sandpaper grit or an oil slick. Other examples are also possible.

Figure 5B:
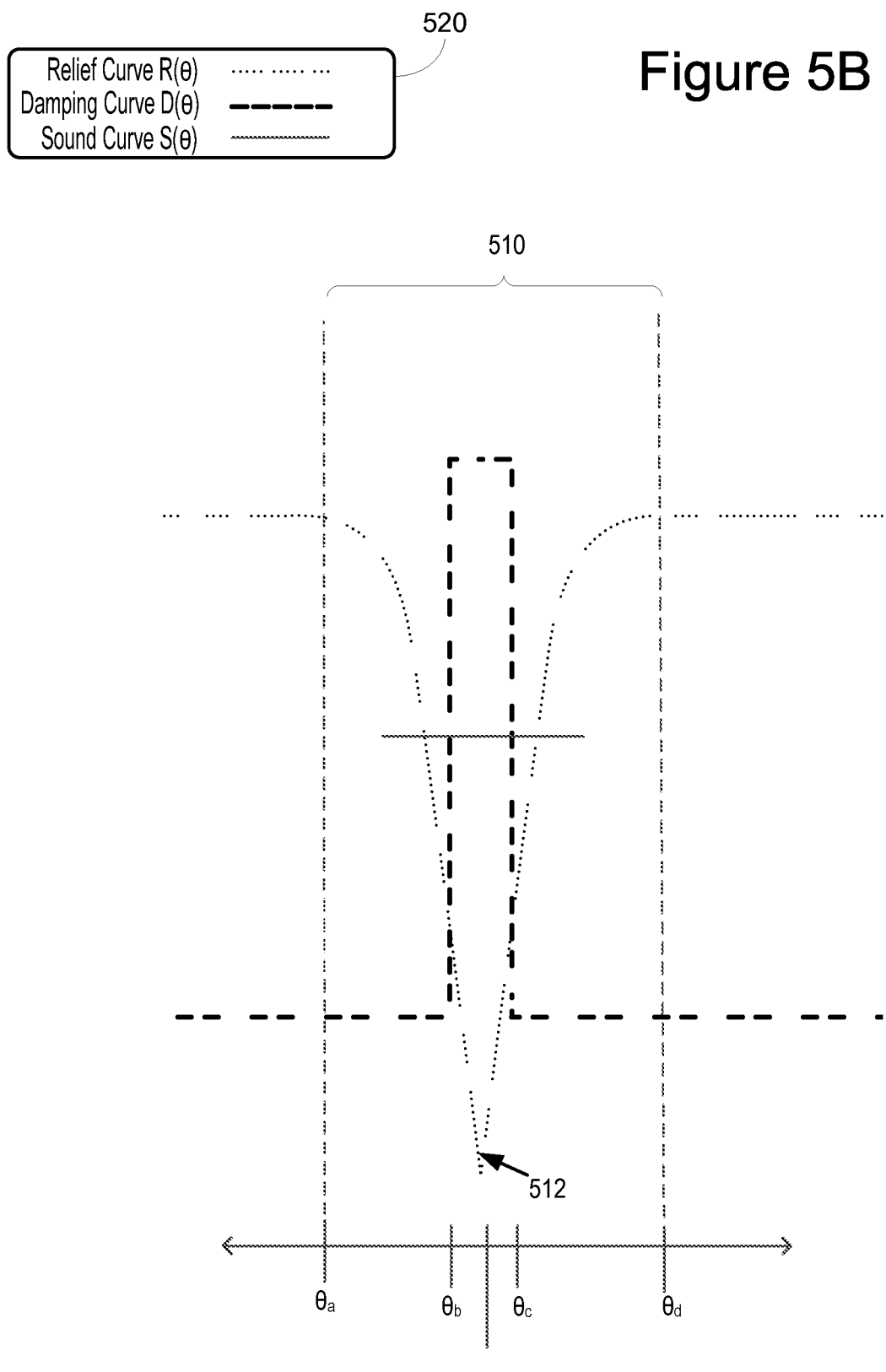
Figure 5C:
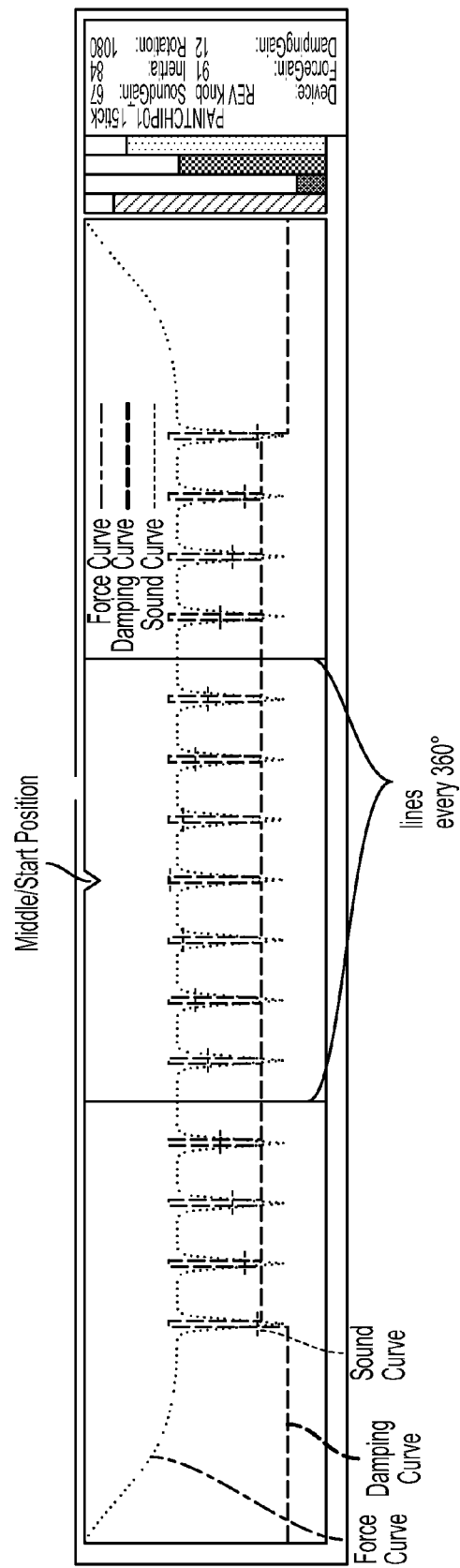

FIG. 5B provides a more detailed view of a portion 510 of graphic card 500, which may be visually identifiable as providing a notch or detent. More specifically, when $T_{relief}$ (θ) is defined as described above, the combination of an inflection point of R(θ) aligned with a square-shaped portion of D(θ) that occur during portion 510 of the graphs, may provide the feel of a notch or detent during the rotation of a haptic knob.

More specifically, in FIG. 5B, portion 510 of R(θ) includes a downward sloping portion followed by an upward sloping portion. Thus, as the user rotates the knob clockwise from position $\theta_a$ towards $\theta_b$, the slope of R(θ) becomes increasingly negative, such that $T_{relief}(\theta)$ provides more and more assistance to the user turning the knob, until the inflection point in R(θ) at 60°. However, at position $\theta_b$, the damping curve D(θ) becomes positive, such that the damping torque contribution $T_{damp}(\theta)$ resists the clockwise rotation of the knob. Further, because of the assistance provided by $T_{relief}(\theta)$ when moving from $\theta_a$ to $\theta_b$, the knob may be accelerating in the counterclockwise direction when it arrives at position $\theta_b$. Thus, when the knob reaches $\theta_b$, both the damping torque contribution $T_{damp}(\theta)$ and the inertial torque contribution $T_{inertia}(\theta)$ may initially resist the clockwise rotation of the knob, such that it will become more difficult for the user to continue turning the knob. Then, at the inflection point, the slope of R(θ) becomes positive, such that the relief torque contribution $T_{relief}(\theta)$ suddenly and greatly increases, which will likely stop the rotation of the knob (and cause $T_{damp}(\theta)$ and $T_{inertia}(\theta)$ to go to zero).

In the foregoing example, the feeling as the motor initially assists the user in turning the knob from $\theta_a$ to $\theta_b$ (or perhaps even turns the knob autonomously), followed by the increased resistance starting at $\theta_b$ and the sharp increase in resistance at θ=60°, may simulate the feeling of, e.g., a spring-loaded lever slipping into a detent and stopping as the lever contacts a far side of the detent and arrests the movement of the knob. As such, portion 510 of the curves shown on card 500 may provide, and be readily recognized by those with experience as a visualization of, a notch or detent.

Note also that once $T_{damp}(\theta)$ and $T_{inertia}(\theta)$ begin to resist rotation of the knob at $\theta_b$, the knob may begin to decelerate in the clockwise direction. When the knob decelerates, the inertial torque contribution $T_{inertia}(\theta)$ may begin to assist the user in rotating the knob clockwise. Thus, at some point between $\theta_b$ and 60°, $T_{inertia}(\theta)$ and $T_{damp}(\theta)$ may oppose each other. The fact that $T_{inertia}(\theta)$ and $T_{damp}(\theta)$ provide opposing torque contributions may provide a damping effect, which prevents or reduces oscillation of the knob when it arrives at the inflection point at θ=60°, and enhances the feeling of the knob clicking into a detent. (In some sense, $T_{damp}(\theta)$ may be considered to provide a damping effect on its own, and $T_{inertia}(\theta)$ may augment this damping effect with an effect of the knob having variable "heaviness".) Further, the sound resulting from portion 510 of the sound curve S(θ) may simulate a "clicking" sound, and thus may serve to further enhance the simulation of a knob clicking into a mechanical detent.

Further, once the knob at the simulated detent at θ=60°, the user may apply an amount of torque necessary to move the knob past 60°. As shown in FIG. 5B, the slope of R(θ) is positive between 60° and $\theta_d$. Further, the slope of R(θ) becomes less and less positive as the user rotates the knob clockwise from the inflection point at 60° towards position $\theta_d$. As a result, the amount of resistance due to the relief torque contribution $T_{relief}(\theta)$ will decrease as the knob is rotated from 60° to $\theta_d$, until $T_{relief}(\theta)$ goes to zero at position $\theta_b$ (since $dR(\theta_b)/d\theta$ is equal to zero).

In addition, between 60° to $\theta_c$, the damping curve D(θ) remains positive, such that the damping torque contribution $T_{damp}(\theta)$ and the inertial torque contribution $T_{inertia}(\theta)$ make it even more difficult for the user to rotate the knob out of the simulated detent. Once the value of the damping curve D(θ) drops to zero at $\theta_c$, the resistance to clockwise rotation will drop significantly, and then will continue to decrease as the user rotates the knob clockwise from 60° to $\theta_d$. At $\theta_d$, the resistance to rotation may be zero, or may return to some default constant value. Thus, when the user moves the knob clockwise from 60° to $\theta_d$, graphic card 500 may simulate the feeling of, e.g., the initially difficulty of moving a spring-loaded lever out of a physical detent, following by the drop in resistance as the lever slips out of the detent and allows the knob to continue it normal rotation (perhaps until the lever arrives at the next detent).

As the foregoing example illustrates, the shape of the curves on portion 510 may provide a realistic haptic simulation of mechanical notch or detent. As such, a user with some experience with such graphic cards, may quickly recognize portion 510 as providing a detent or notch. Further, referring back to FIG. 5A, since the shapes of the curves on graphic card 500 repeat every sixty degrees, a user who views graphic card 500 may quickly recognize graphic card 500 as defining an operational mode of a haptic knob with a notch or detent every sixty degrees.

Note that the example "feel," which includes periodic detents during rotation of the knob, is not intended to be limiting. Other functionality and "feels" of a knob may also be provided by varying the shapes of the parameter curves on a graphic card, and the manner in which the different parameter curves interact with one another. As such, a card designer may learn to create many different haptic feels by creating corresponding graphic cards. Similarly, users may learn to quickly recognize how a controller will feel when an operational mode is loaded, simply by looking at the shapes of the curves on the graphic card that describes the operational mode.

IV. Systems for Loading Graphic Cards to Rotatable Interface Components

Referring back to FIGS. 2A to 4, a computing device 200 and/or a controller 300 may be configured to detect a graphic card with a graph feature corresponding to a particular operational mode of the controller's knob. Further, computing device 200 and/or controller 300 may respond to detection of such a graphic card by loading the operational mode corresponding to the graph feature to the controller 300. Further, if the controller 300 detects a particular graphic card, the controller may load a portion of the corresponding operational mode to itself. Alternatively, the controller 300 could send the raw sensor data in which graphic cards are detectable to the computing device 200 so that the computing device 200 could load the operational mode corresponding to the card. As yet another alternative, the controller 300 could detect the particular graphic card, and identify the detected card for the computing device 200 so that the computing device can determine and load the corresponding operational mode to the controller. Other distributions of functionality between controller 300 and computing device 200 are also possible.

In an example embodiment, to detect a graphic card that includes a graph feature describing a particular operational mode of a rotatable interface component, a computing device 200 may include at least one sensor 210 that is operable to generate sensor data that is indicative of the graphic card. Additionally or alternatively, controller 300 may include a sensor or sensors that can be used to detect graphic cards corresponding to particular operational modes.

In some embodiments, the at least one sensor that is operable to generate sensor data that is indicative of the graphic card may simply be a camera, such as those that are typically included in mobile phones and tablets, among other possibilities. As another example, which is shown in FIG. 4, the lens 430 of a camera may be located in the center portion of the controller housing (which the knob may rotate around). Other camera arrangements of a camera on the controller or an affiliated computing device are also possible.

In an embodiment where a camera is used to detect a graphic card, image data from a camera may be analyzed to detect the graphic card. For example, the camera may capture an image that includes the graphic card, and the image may then be analyzed to detect the particular graphic card in the image. In some embodiments, the camera may be configured to capture a bitmap image (e.g., stored as a .bmp file), which may be analyzed to detect the particular curves on the card's graph feature. Of course, other types of image files may also be utilized. In any case, the curves that are derived from an image of the graphic card may be used to generate an operational mode (or to modify portions of an existing operational mode) that corresponds to the card, such that this operational mode can be loaded to the controller.

As a specific example, an image of a particular graphic card may be analyzed to detect the particular curves that are shown on the card. The computing device or controller can then determine the respective shapes of the curves, and generate torque contribution functions based on the determined shapes of the curves. These torque contribution functions may be derived from the curves shown on a graphic card in the manner described in reference to FIG. 5A above, or possibly in another manner. In any event, these torque contribution functions may be associated with an operational mode, which can then be loaded to the haptic knob controller. By doing so, the controller may provide the "feel" that is visually described by the particular graphic card.

Figure 6:
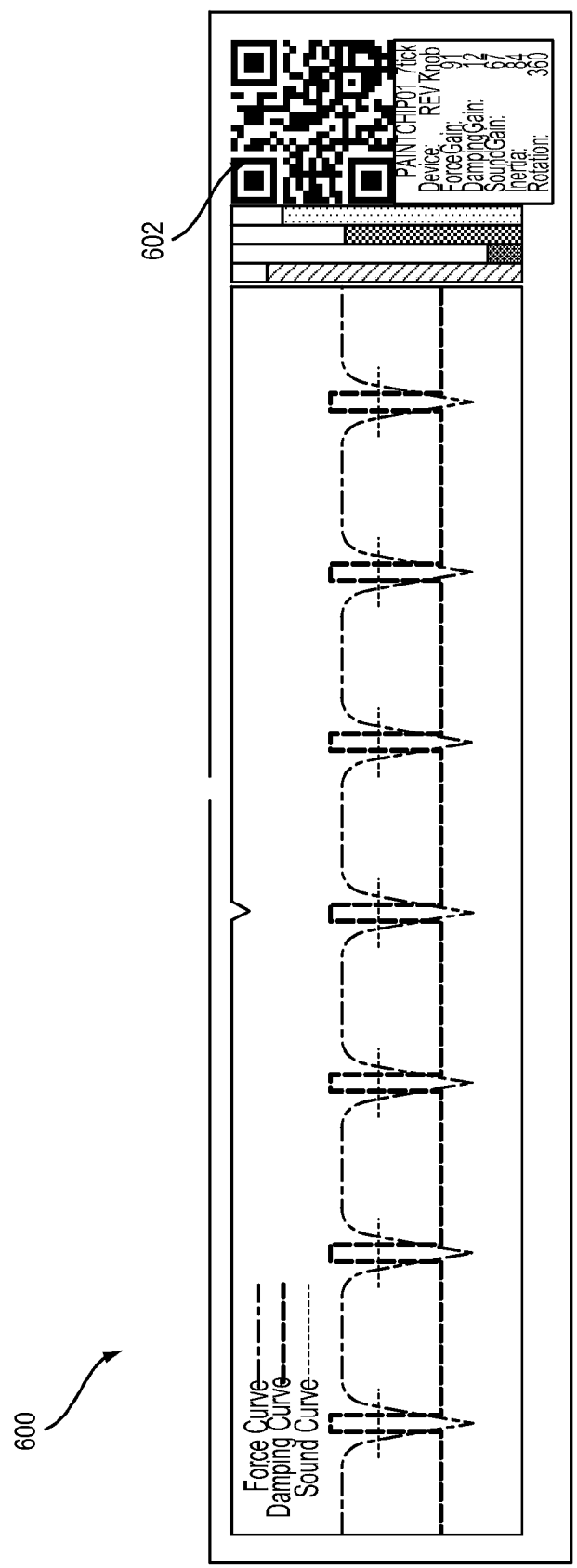
FIG. 6 is another illustration of a graphic card according to example embodiments.

In other embodiments, a graphic card may include a visual code that identifies the particular operational mode that is visually described by the curves on the card. For example, a graphic card may include a QR code, or another type of machine-readable code, which identifies the particular operational mode that is described by the curves on the card. FIG. 6 is an illustration showing a graphic card 600, which includes a QR code 602. In such an embodiment, a computing device 200 or controller 300 may use its camera to capture an image of the graphic card, and analyze the image to detect the QR code 602. For example, a computing device such as a tablet or phone may use a built-in camera to take a picture of the graphic card, which may then be analyzed to detect the QR code. Other examples are also possible. Once the QR code is identified, the computing device 200 or controller 300 may access a database of operational modes to determine the particular operational mode that is identified by the QR code.

In some embodiments, a graphic card may include a radio frequency ID (RFID) that identifies the operational mode that is visually described by the card. For example, a graphic card may include an RFID tag or an NFC tag, which uniquely identifies the corresponding operational mode. The RFID tag may be embedded in or otherwise arranged within, on, or nearby to a graphic card. As such, a computing device 200 may include an RFID reader, such as an NFC receiver, which may be utilized to detect the RFID tag of a particular graphic card, and responsively load the operational mode that corresponds the card to the controller 300.

In some embodiments, a graphic card may be displayed on the surface of a robotic device, which describes an operational mode that is specific to a component of the robot (e.g., to a robotic joint). In such cases, it is also possible that computing device 200 or controller 300 may include at least one wired or wireless communication system that is operable to for direct or network-based communications with a corresponding communication system of the robotic device. As such, the robotic device may identify the operational mode to the computing device 200 or controller 300 via such wired or wireless communication systems.

In a further aspect, an example GUI may be provided via which a user could create a new paint chip by shaping the curves on the graph (e.g., by shaping the red force curve and/or the green viscosity curve). The graph could also be adjusted using other parameters of the controller, which could be displayed using other colors.

In another aspect, a paint chip may be a still image, or may be a video. In a video paint chip, the curves and/or plots of parameters may change over time. Therefore, applying a video paint chip to the controller may cause the operational parameters of the controller to change over time in a corresponding manner.

In a further aspect, an application running on a computing device or controller may provide a graphical user interface (GUI) that allows a user to load a particular graphic card to a haptic knob controller. For example, an application may provide a GUI that allows a user to drag a graphic card to an icon representing the controller or a robot joint, in order to load the operational mode described by the card to the controller or a robot joint. Further, in some implementations, such an application may provide functions that allow a user to create, edit, and store graphic cards; e.g., by providing a visual editing interface for creating and editing the curves that appear on a particular graphic card.

V. Example Methods

Figure 7:
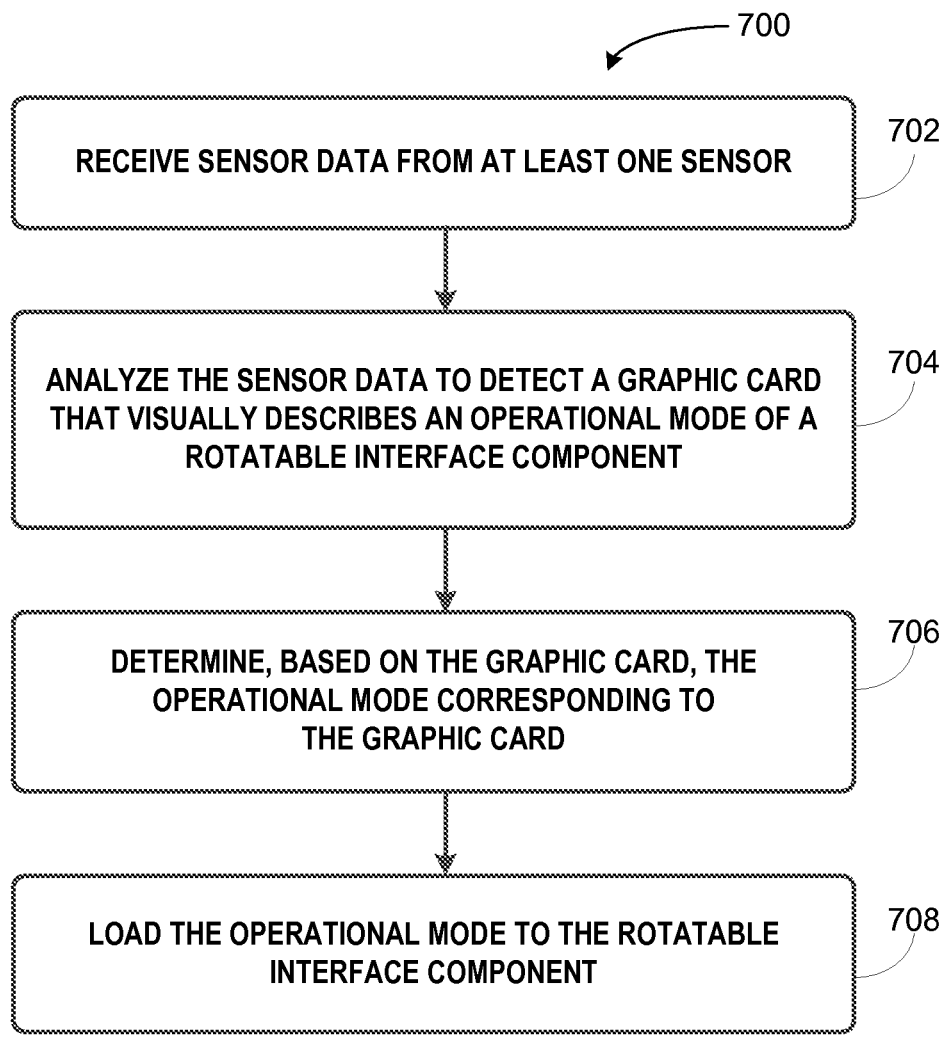
FIG. 7 is a flow chart showing a method according to an example embodiment.

FIG. 7 shows a method 700 according to an example embodiment. In particular, method 700 may be implemented by a computing device to detect a graphic card that visually describes an operational mode, and to then load the described operational mode to a rotatable interface component, such as a haptic knob controller.

More specifically, method 700 involves a computing device receiving sensor data from at least one sensor, as shown by block 702. For instance, as described above, the sensor data may be image data from a camera, a visual code such as a QR code, and/or an RFID, among other possibilities.

The computing device then analyzes the sensor data to detect a graphic card that visually describes an operational mode of a rotatable interface component, as shown by block 704. The graphic card detected at block 704 may take various forms, such as those described above in reference to FIGS. 5A to 6, among other possibilities. In an example embodiment, the graphic card visually describes the operational mode on a graph feature having a number of curves that include at least a first and second curve, where the first curve indicates a first rotationally-varying parameter as a function of position of the rotatable interface component and the second curve indicates a second rotationally-varying parameter as a function of the position of the rotatable interface component. Thus, as further described above, the graphic card may be detected by analyzing image data that includes the card, detecting a visual code associated with the card, and/or detecting an RF associated with the card, among other possibilities.

Referring now to block 706, the computing device can then determine, based on the graphic card, the operational mode corresponding to the graphic card. For example, in an embodiment where the graphic card includes a bitmap image with at least the first and the second curves, presented in different visual formats, and process of determining the operational mode may involve analyzing the bitmap image to determine the first and the second curves (e.g., using various image-processing techniques). Alternatively, in an embodiment where the graphic card includes an identifying visual code (e.g., a QR code or textual identifier), the computing device may determine the visual code, and access a database that maps visual codes to operational modes in order to determine the particular operational mode that is visually described by the graphic card. Other implementations are also possible.

Referring now to block 708, the computing device can then load the operational mode to the rotatable interface component. In an example embodiment, the operational mode specifies operations for a motor such that the motor generates torque on the interface component based on at least the first and second curves of the first and second rotationally-varying parameters (and possibly additional curves representing other rotationally varying parameters). As such, loading the operational mode to the rotatable interface component may involve determining and/or applying torque contribution functions to determine total applied torque as a function of at least the position of the knob, such as described above in reference to FIGS. 5A to 6.

VI. Additional Implementation for Linear Controllers

In a variation on embodiments described above, a graphic card may include a graph feature that visually describes an operational mode for other types of moveable interface devices, that do not move rotationally. For example, graphic cards could be used to describe operational modes for a control device that is moveable in a linear fashion. As a specific example, a graphic cards could specify operational modes for a linear control device such as a slider (e.g., a MIDI slider).

In an implementation for a linear slider device, a controllable motor may apply force to the slider that resists and/or assists linear movement of the slider by the user. As such, a graphic card may include curves that visually describe how positionally varying parameters vary as a function of the position "x" of the slider, within its linear range of movement. For instance, a force function F(x) may indicate a magnitude and/or direction of force that a motor applies to a slider, as a function of the slider's position x (or the position of any other linearly moveable interface device), in a similar manner as a torque function T(θ) indicates torque as a function of the angular position of a rotatable interface device. Similarly, a graphic card may define a damping function D(x) corresponding to a damping parameter, a sound curve S(x) corresponding to a sound parameter, an inertia curve I(x) corresponding to an inertia parameter, and/or curves for other parameters that vary as a function of the position of a linear interface component within its range of linear movement.

Figure 8:
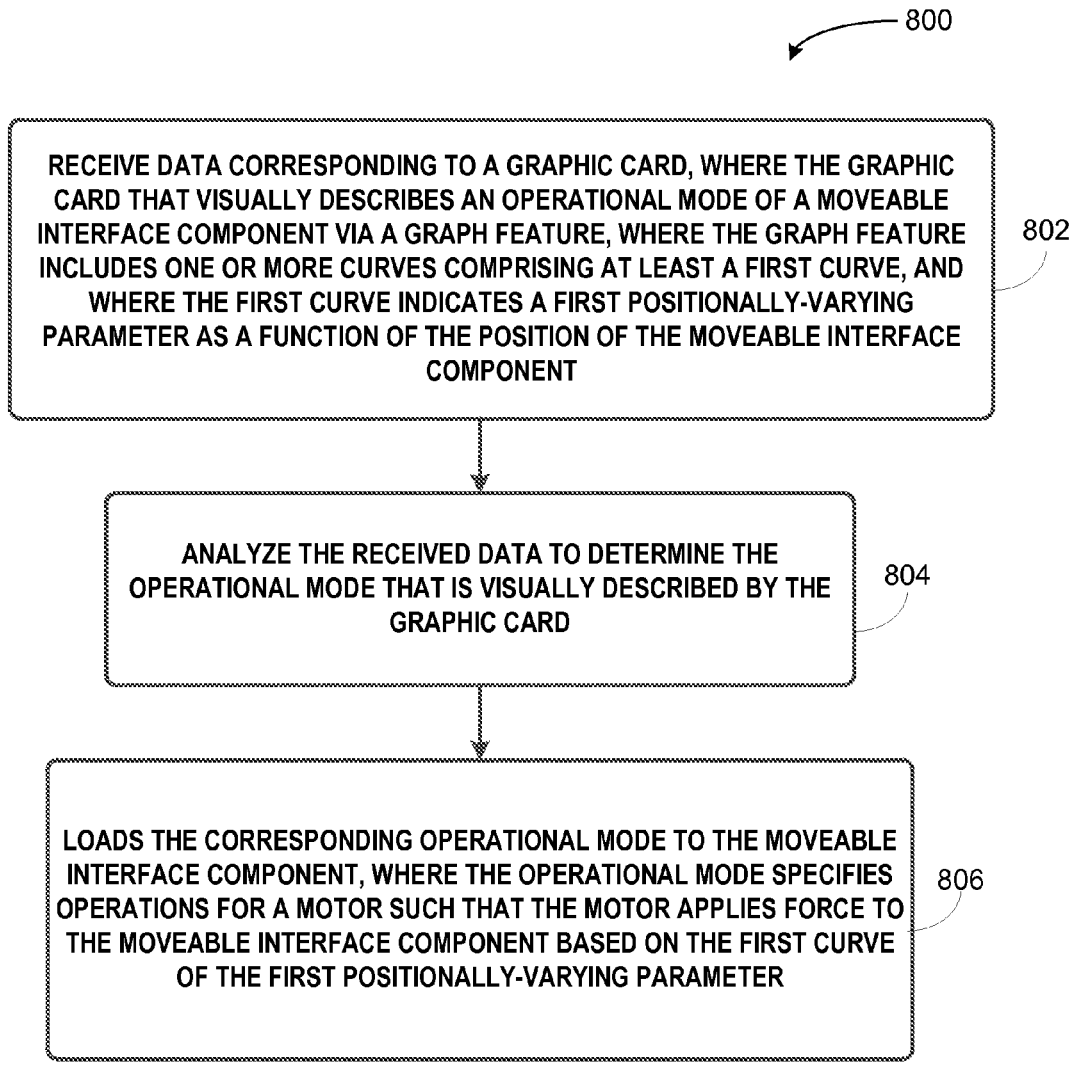
FIG. 8 is a flow chart showing another method according to an example embodiment.

FIG. 8 is a flowchart showing a method 800, according to an example embodiment. Method 800 may be implemented to load an operational mode to a moveable interface component, such as a linearly moveable interface component. It should be understood, however, that method 800 could also be implemented to a rotationally moveable interface component, or interface components that are moveable in other ways.

As shown by block 802, method 800 involves a computing device receiving data corresponding to a graphic card, where the graphic card that visually describes an operational mode of a moveable interface component via a graph feature, where the graph feature includes one or more curves comprising at least a first curve, and where the first curve indicates a first positionally-varying parameter as a function of the position of the moveable interface component. The computing device analyzes the received data to determine the operational mode that is visually described by the graphic card, as shown by block 804. The computing device then loads the corresponding operational mode to the moveable interface component, where the operational mode specifies operations for a motor such that the motor applies force to the moveable interface component based on the first curve of the first positionally-varying parameter, as shown by block 806.

As noted above, method 800 may be implemented for a linearly moveable interface component, such as a slider. In such an implementation, the first positionally-varying parameter is a function of the linear position of the linearly moveable interface component. As further noted above, method 800 may also be implemented for a rotatable interface component, such as a knob controller. In such an implementation, the first curve can indicate a first rotationally-varying parameter as a function of the angular position of the rotatable interface component.

VI. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A system comprising:
   at least one sensor that is operable to generate sensor data that is indicative of a graphic card that visually describes an operational mode of a rotatable interface component, wherein the graphic card visually describes the operational mode on a graph feature having a plurality of curves comprising at least a first and second curve, wherein the first curve indicates a first rotationally-varying parameter as a function of position of the rotatable interface component and the second curve indicates a second rotationally-varying parameter as a function of the position of the rotatable interface component; and
   a control system configured to:
   analyze the sensor data to detect the graphic card;
   determine the operational mode corresponding to the graphic card; and
   load the operational mode to the rotatable interface component, wherein the operational mode specifies operations for an actuator such that the actuator applies torque to the rotatable interface component based at least in part on both: (a) the first curve of the first rotationally-varying parameter and (b) the second curve of the second rotationally-varying parameter.

2. The system of claim 1, wherein the first curve and the second curve have different visual formats on the graphic card.

3. The system of claim 1, wherein the graphic card comprises a bitmap image that includes at least the first and the second curves, and wherein, to determine the particular operational mode, the control system:
   analyzes the bitmap image to determine the first and the second curves.

4. The system of claim 1, wherein the graphic card comprises a visual code that uniquely identifies the corresponding operational mode.

5. The system of claim 4, wherein the visual code comprises at least one visual code selected from a group of visual codes comprising a unique text identifier and a machine-readable code.

6. The system of claim 5, wherein the visual code comprises a QR code.

7. The system of claim 1, wherein the at least one sensor comprises an image capture device.

8. The system of claim 1, wherein the control system is further configured to respond to detection of the graphic card by determining the operational mode and loading the operational mode to the rotatable interface component.

9. The system of claim 1, wherein the first rotationally-varying parameter comprises a rotationally-varying haptic parameter for the interface component, and wherein the second rotationally-varying parameter comprises a second rotationally-varying haptic parameter for the interface component.

10. The system of claim 8, wherein the first rotationally-varying haptic parameter comprises a relief parameter, and wherein the second rotationally-varying haptic parameter comprises a damping parameter.

11. The system of claim 8, wherein the operational mode comprises: (i) a first torque contribution function corresponding to the first rotationally-varying haptic parameter, and (ii) a second torque contribution function corresponding to the second rotationally-varying haptic parameter.

12. The system of claim 8, wherein the operational mode comprises: (i) a relief torque contribution function corresponding to the first rotationally-varying haptic parameter, (ii) a damping torque contribution function corresponding to the second rotationally-varying haptic parameter, and (iii) an inertial torque contribution function corresponding to the second rotationally-varying haptic parameter.

13. The system of claim 8, wherein the plurality of curves on the graphic card further comprises a third curve that indicates a third rotationally-varying parameter as a function of the position of the rotatable interface component.

14. The system of claim 13, wherein the third rotationally-varying parameter comprises a sound parameter.

15. The system of claim 13, wherein the operational mode comprises: (i) a relief torque contribution function corresponding to the first rotationally-varying haptic parameter, (ii) a damping torque contribution function corresponding to the second rotationally-varying haptic parameter, and (iii) a sound torque contribution function corresponding to the third rotationally-varying haptic parameter.

16. The system of claim 1, wherein the actuator comprises a motor.

17. A method comprising:
    receiving, by a computing device, sensor data from at least one sensor;
    analyzing, by the computing device, the sensor data to detect a graphic card that visually describes an operational mode of a rotatable interface component, wherein the graphic card visually describes the operational mode on a graph feature having a plurality of curves comprising at least a first and second curve, wherein the first curve indicates a first rotationally-varying parameter as a function of position of the rotatable interface component and the second curve indicates a second rotationally-varying parameter as a function of the position of the rotatable interface component;
    determining, based on the graphic card, the operational mode corresponding to the graphic card; and
    loading the operational mode to the rotatable interface component, wherein the operational mode specifies operations for a motor such that the motor generates torque on the interface component based on both: (a) the first curve of the first rotationally-varying parameter and (b) the second curve of the second rotationally-varying parameter.

18. The method of claim 17, wherein the graphic card comprises a bitmap image that includes at least the first and the second curves, wherein the first and the second curve each have a different visual format, and wherein determining the operational mode corresponding to the graphic card comprises analyzing the bitmap image to determine the first and the second curves.

19. The method of claim 18, wherein determining the operational mode corresponding to the graphic card further comprises determining a plurality of torque contribution functions corresponding to the first and the second curves.

20. The method of claim 19, wherein loading the operational mode to the rotatable interface component comprises using the plurality of torque contribution functions to determine applied torque as a function of at least the position of the rotatable interface component.

21. The method of claim 19, wherein the plurality torque contribution functions comprise: (i) a relief torque contribution function corresponding to the first rotationally-varying haptic parameter, and (ii) a damping torque contribution function corresponding to the second rotationally-varying haptic parameter.

22. The method of claim 21, wherein the plurality torque contribution functions comprise: an inertial torque contribution function corresponding to the second rotationally-varying haptic parameter.

23. The method of claim 22, wherein the plurality of curves on the graphic card further comprises a third curve that indicates a sound parameter as a function of degree of rotation of the rotatable interface component, and wherein the plurality torque contribution functions comprise a sound torque contribution function corresponding to the third rotationally-varying haptic parameter.

24. A system comprising:
at least one wireless communication system that is operable to receive a radio-frequency (RF) signal comprising an indication of a graphic card that visually describes an operational mode of a rotatable interface component, wherein the graphic card visually describes the operational mode on a graph feature having a plurality of curves comprising at least a first and second curve, wherein the first curve indicates a first rotationally-varying parameter as a function of position of the rotatable interface component and the second curve indicates a second rotationally-varying parameter as a function of the position of the rotatable interface component; and
a control system configured to:
operate the wireless communication system to receive the RF signal;
respond to receipt of the RF signal by determining the operational mode that is visually described by the graphic card; and
load the operational mode to the rotatable interface component, wherein the operational mode specifies operations for a motor such that the motor applies torque to the rotatable interface component based at least in part on both: (a) the first curve of the first rotationally-varying parameter and (b) the second curve of the second rotationally-varying parameter.

25. The system of claim 24, wherein the at least one wireless communication system comprises a radio-frequency identification (RFID) system that is operable to an RFID associated with the graphic card.

26. The system of claim 24, wherein the at least one wireless communication system comprises a near-field communication (NFC) system to communicate, using an NFC protocol, with a computing device associated with the graphic card to determine the indication of the graphic card.

27. A method comprising:
receiving, by a computing device, data corresponding to a graphic card, wherein the graphic card that visually describes an operational mode of a moveable interface component via a graph feature, wherein the graph feature includes one or more curves comprising at least a first curve, wherein the first curve indicates a first positionally-varying parameter as a function of the position of the moveable interface component;
analyzing, by the computing device, the received data to determine the operational mode that is visually described by the graphic card; and
loading the corresponding operational mode to the moveable interface component, wherein the operational mode specifies operations for a motor such that the motor applies force to the moveable interface component based on the first curve of the first positionally-varying parameter.

28. The method of claim 26, wherein the moveable interface component comprises a linearly moveable interface component, wherein the first positionally-varying parameter is a function of the linear position of the linearly moveable interface component.

29. The method of claim 26, wherein the moveable interface component comprises a rotatable interface component, and wherein the first curve indicates a first rotationally-varying parameter as a function of position of the rotatable interface component.

30. The method of claim 26, wherein the one or more curves further comprise a second curve, wherein the second curve indicates a second positionally-varying parameter as a function of the position of the moveable interface component, and wherein the operational mode specifies operations for a motor such that the motor generates torque on the interface component based on both: (a) the first curve of the first positionally-varying parameter and (b) the second curve of the second positionally-varying parameter.

* * * * *